United States Patent
Barton et al.

(10) Patent No.: US 10,349,384 B2
(45) Date of Patent: Jul. 9, 2019

(54) SPECTRUM CONTROLLER FOR CELLULAR AND WIFI NETWORKS

(71) Applicant: Cisco Technology, Inc., San Jose, CA (US)

(72) Inventors: Robert Barton, Richmond (CA); M. David Hanes, Lewisville, NC (US); Gonzalo Salgueiro, Raleigh, NC (US); Jerome Henry, Pittsboro, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/821,767

(22) Filed: Nov. 23, 2017

(65) Prior Publication Data

US 2019/0159176 A1    May 23, 2019

(51) Int. Cl.
*H04L 12/28* (2006.01)
*H04W 72/04* (2009.01)
*H04W 84/12* (2009.01)

(52) U.S. Cl.
CPC ............ *H04W 72/04* (2013.01); *H04W 84/12* (2013.01)

(58) Field of Classification Search
CPC ....................................................... H04L 12/28
USPC ......................................................... 370/329
See application file for complete search history.

(56) References Cited

U.S. PATENT DOCUMENTS

| 8,775,631 | B2 | 7/2014 | Luna |
| 9,084,260 | B2 | 7/2015 | Maltsev et al. |
| 9,455,923 | B2 | 9/2016 | Mirza et al. |
| 2012/0327779 | A1* | 12/2012 | Gell ................... H04L 47/2475 370/238 |
| 2013/0079055 | A1 | 3/2013 | Jouin |
| 2015/0334712 | A1 | 11/2015 | Maaref et al. |
| 2017/0048127 | A1 | 2/2017 | Almodovar Chico et al. |
| 2017/0180938 | A1 | 6/2017 | Smith |

FOREIGN PATENT DOCUMENTS

WO    2016204639    12/2016

OTHER PUBLICATIONS

Quirk, Ronald E. Jr.; Reader Forum: FCC Spectrum Rules Create Business Opportunities (Sep. 22, 2015).
Schaubach, Kurt; The Technology Behind Spectrum Sharing—The Spectrum Controller (Jul. 6, 2017).

(Continued)

*Primary Examiner* — Dang T Ton

(57) ABSTRACT

In one embodiment a method including obtaining metrics regarding a WiFi network and a RAN having overlapping coverage ranges, based at least partly on the metrics, allocating a first adjusted spectrum allocation to a first network, and a second adjusted spectrum allocation to a second network, the first adjusted spectrum allocation decreased from a first current spectrum allocation, and the second adjusted spectrum allocation increased from a second current spectrum allocation, and causing enforcement of the first adjusted spectrum allocation and the second adjusted spectrum allocation, wherein the obtaining, allocating and causing are performed a plurality of times, and wherein in at least one of the plurality of times the first network is the WiFi network and the second network is the RAN, and in at least one other of the plurality of times the first network is the RAN and the second network is the WiFi network.

20 Claims, 5 Drawing Sheets

(56) References Cited

OTHER PUBLICATIONS

Sohul, Munawwar M. et al.; Spectrum Access System for the Citizen Broadband Radio Service; , in IEEE Communications Magazine, vol. 53, No. 7, pp. 18-25, Jul. 2015. doi: 10.1109/MCOM.2015.7158261.
Digi-Key Electronics; Wireless Architectures for Data Acquisition in Industrial Automation (Mar. 21, 2013) Can be seen at: https://www.digikey.com.au/en/articles/techzone/2013/mar/wireless-architectures-for-data-acquisition-in-industrial-automation.
Qualcomm Technologies, Inc.; LTE in Unlicensed Spectrum: Harmonious Coexistence With Wi-Fi (Jun. 2014).
OpenAirInterface; Software-Defined 5G System Cloud RAN (C-RAN); 2017.
Ericsson; LTE-U Coexistence (May 28, 2015).
Watanabe, Kimio et al.; Outdoor LTE Infrastructure Equipment (ENODEB); Fujitsu Sci Tech. J. vol. 48, No. 1, Jan. 2012.

\* cited by examiner

SPECTRUM CONTROLLER FOR CELLULAR AND WIFI NETWORKS

TECHNICAL FIELD

The present disclosure generally relates to wireless networks.

BACKGROUND

As radio access networks of cellular networks (also referred to as mobile networks) begin to occupy the industrial, scientific, and medical radio (ISM) band already occupied by WiFi networks, different types of wireless networks (e.g. radio access networks, WiFi networks, etc.) pose challenges to one another. Co-existence is rendered more complex by the mutual un-intelligibility of the different wireless networks. For example, a radio access network using long term evolution (LTE) technology in unlicensed spectrum (LTE-U) is not adapted to appropriately process the 802.11 frame structure of WiFi. WiFi is not adapted to appropriately process an LTE-U transmission. License assisted access (LAA) is not adapted to read the 802.11 transmission duration values in the physical layer (PHY) or media access control (MAC), or to recognize a user priority (UP) 6 frame from a probe request.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
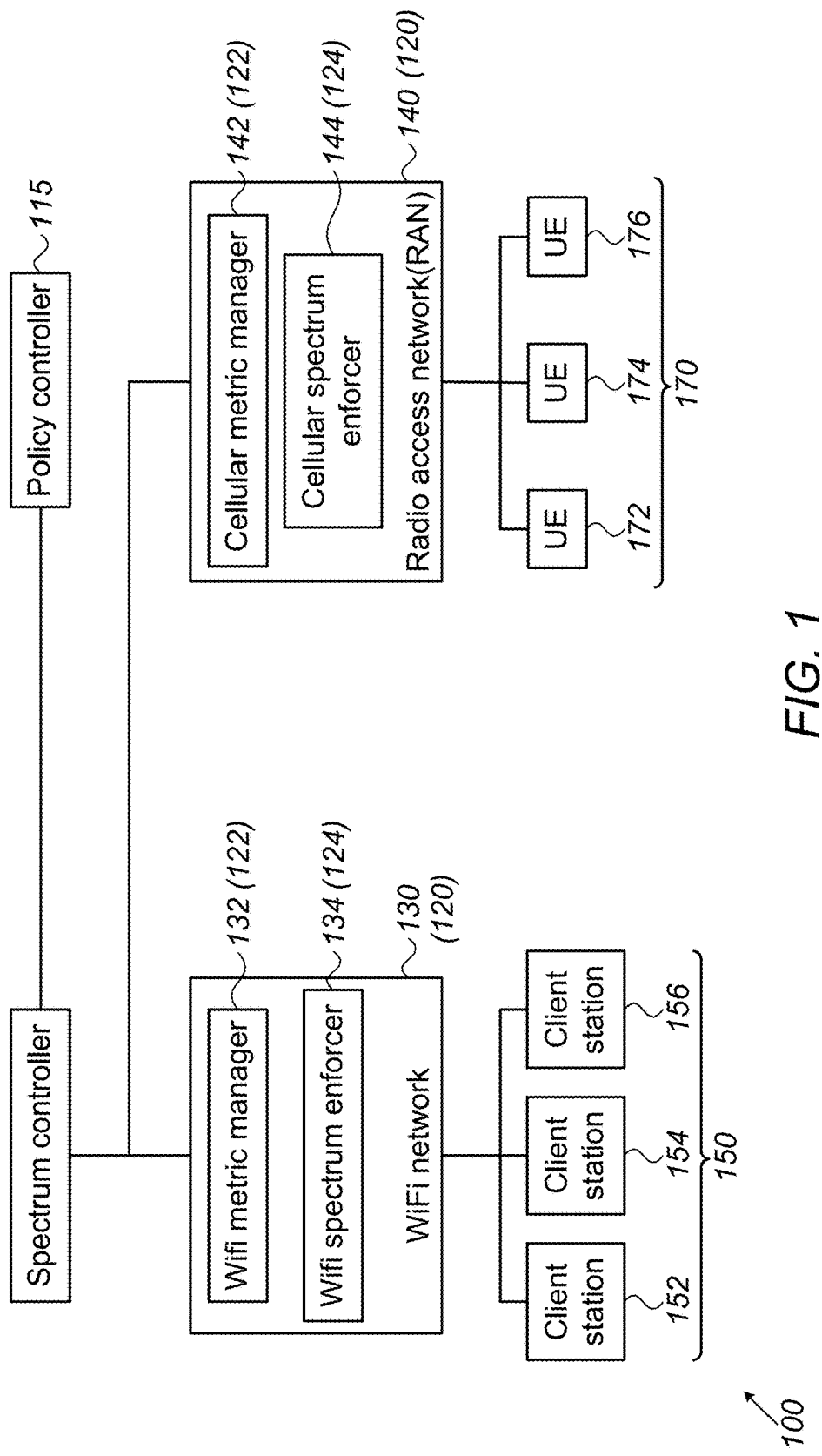
FIG. 1 is a block diagram of a system, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the elements, modules, stages, etc. of a given system, apparatus, method, etc.

DESCRIPTION OF EXAMPLE EMBODIMENTS

Overview

There is provided, in accordance with some embodiments of the presently disclosed subject matter, an apparatus comprising processing circuitry, and at least one computer readable storage medium adapted to store data used by the processing circuitry, wherein the processing circuitry is adapted to perform the following a plurality of times obtain metrics regarding a WiFi network and a radio access network (RAN) of a cellular network, the WiFi network and the RAN having overlapping coverage ranges, based at least partly on the metrics, allocate a first adjusted spectrum allocation to a first network, of the WiFi network and RAN, and a second adjusted spectrum allocation to a second network, of the WiFi network and RAN, the first adjusted spectrum allocation decreased from a first current spectrum allocation for the first network, and the second adjusted spectrum allocation increased from a second current spectrum allocation for the second network, and cause enforcement of the first adjusted spectrum allocation and the second adjusted spectrum allocation, wherein in at least two of the plurality of times, the metrics are indicative that for the first network, the first current spectrum allocation is greater than or equal to a first current spectrum requirement for the first network, and that for the second network, the second current spectrum allocation is less than a second current spectrum requirement for the second network, and wherein in at least one of the at least two times the first network is the WiFi network and the second network is the RAN, and in at least one other of the at least two times the first network is the RAN and the second network is the WiFi network.

DETAILED DESCRIPTION OF EXAMPLE EMBODIMENTS

FIG. 1 is a block diagram of a system 100, in accordance with some embodiments of the presently disclosed subject matter.

System 100 includes a spectrum controller 110. Spectrum controller 110 may be implemented by any appropriate hardware and/or software that performs the functionality attributed herein to spectrum controller 110, e.g. functionality including spectrum allocation. Software when referred to herein, includes firmware, where appropriate. Spectrum controller 110 may, for instance, be a software-defined controller.

System 100 further includes two wireless networks 120, namely a WiFi network 130, and a radio access network (RAN) 140 of a cellular network. WiFi network 130 is based on the Institute of Electrical and Electronics Engineers (IEEE) 802.11 standards. RAN 140 may be, for example, part of a 3G, 4G or 5G cellular network conforming to the 3GPP standard. If, for example, the cellular network is a 5G network, the cellular network may conform to standard(s) for any of LAA, LTE-U, multefire, new radio, etc.

WiFi network 130 may include one or more wireless access points and optionally a wireless local area network (LAN) controller. RAN 140 may include one or more cellular base stations and optionally a base station controller. Examples of a cellular base station may include an enodeB, nodeB, gNB, or any other appropriate example covering a range of a macro/standard cell. Additional or alternative examples of a cellular base station may include a small cell (e.g. femtocell, microcell, etc.) radio access node, covering a smaller range than a macrocell.

Each wireless network 120 may be operated by any type of entity such as a home, an enterprise, a service provider, etc. Wireless networks 130 and 140 need not be operated by the same entity. Wireless networks 130 and 140 may in some embodiments be operated by the same entity.

Wireless access point(s) of WiFi network 130 may be adapted to communicate with one or more wireless devices 150. Cellular base station(s) of RAN 140 may be adapted to communicate with one or more wireless devices 170. For example, wireless device(s) 150 and/or 170 may include laptop(s), smartphone(s), Internet of Things device(s) adapted to communicate wirelessly, any other device(s) adapted to communicate wirelessly, etc.

Wireless devices 150 are also referred to herein as client stations 150. Three client stations 152, 154, and 156 are shown in FIG. 1, but other embodiments of system 100 may include fewer or more client stations 150. Client stations 150 may be adapted to communicate with wireless access point(s) of WiFi network 130 (e.g. adapted to communicate due to each client station 150 including at least one antenna and at least one transmitter/receiver for WiFi technology).

A wireless device 170 is also referred to herein as a user equipment (UE) 170. Three UEs 172, 174 and 176 are shown in FIG. 1, but in other embodiments system 100 may include fewer or more UEs 170. UEs 170 may be adapted to communicate with cellular base station(s) of RAN 140 (e.g. adapted to communicate due to each UE 170 including of at least one antenna and at least one transmitter/receiver for cellular technology). Client stations 150 and UEs 170 may therefore be referred to as communicating via WiFi network 140 and RAN 150 respectively.

It is noted that a particular UE 170 and a particular client station 150 may in fact be the same wireless device that is adapted to communicate with wireless access point(s) of WiFi network 130 and with cellular base station(s) of RAN 140. Such a wireless device is referred to herein as wireless device 150 or wireless device 170 depending on whether reference is being made to communication with wireless access point(s) of WiFi network130 or reference is being made to communication with cellular base station(s) of RAN 140. It is further noted that a particular wireless access point of WiFi network 130 and a particular cellular base station of RAN 140 may or may not be co-located. For example, a transmitter and receiver of a particular wireless access point, and a transmitter and receiver of a particular cellular base station that are co-located may be in the same physical unit (i.e. in the same box), may be in separate physical units that are connected by cable, or may be in separate physical units that are not connected by cable.

WiFi network 130 and RAN 140 have overlapping coverage ranges. The term "overlapping coverage ranges" is used herein to mean that at least part of the range of WiFi network 130 coincides with at least part of the range of RAN 140. Therefore interference may occur if a communication between any cellular base station of RAN 140 and any UE 170 is transmitted using a similar frequency as a communication between any wireless access point of WiFi network 130 and any client station 150.

System 100 optionally includes a policy controller 115. Policy controller 115 may be implemented by any appropriate hardware and/or software that performs the functionality attributed herein to policy controller 115, e.g. functionality including policy determination. Policy controller 115 may be a software defined controller. Policy controller 115 may for instance determine a policy for default spectrum allocations for wireless networks 120 and push the policy to spectrum controller 110. Policy controller 115 may also push policies regarding other wireless networks besides wireless networks 130 and 140 to other spectrum controllers associated with said other wireless networks, and/or push such policies to spectrum controller 110.

Spectrum controller 110 may be located in any appropriate location. For example, spectrum controller 110 may be located in a box (i.e. enclosure) which includes at least one transmitter and receiver of at least one cellular base station of RAN 140, and/or includes at least one transmitter and receiver of at least one wireless access point of WiFi network 140. Alternatively, spectrum controller 110 may be co-located with policy controller 115 (e.g. as part of a Cisco Application Policy Infrastructure Controller Enterprise Module), or may be located at any other location where spectrum controller 110 may communicate with elements (e.g. wireless access point(s), wireless LAN controller, cellular base station(s), base station controller, etc.) of wireless networks 130 and 140, for instance via representation state transfer application program interfaces (REST APIs) and/or the X2 interface. Spectrum controller 110 may not necessarily be located in proximity to such elements. For example, spectrum controller 110 may be implemented using cloud computing (i.e. may be in a cloud), and may be adapted to control the allocation of spectrum to a plurality of pairs of wireless networks 120, each pair of wireless networks 120 including a WiFi network and a RAN overlapping in respective coverage ranges. In some cases where spectrum controller 110 is not in the same box as any element of WiFi network 130 or of RAN 140, spectrum controller 110 may have control plane separation from elements of wireless networks 130 and 140 (e.g. more specifically control plane separation from the wireless access point(s), cellular base station(s) and any controller(s) in wireless networks 130 and 140).

Spectrum allocations are allocated by spectrum controller 110 to WiFi network 130 and RAN 140 from a total spectrum allocation available for allocation to WiFi network 130 and RAN 140. The total spectrum allocation available for allocation is an allocation from the electromagnetic spectrum, e.g. more specifically from the radio spectrum, from which spectrum controller 110 may allocate respective spectrum allocations for WiFi network 130 and RAN 140. In some embodiments, the spectrum allocations that are allocated by spectrum controller 110 to WiFi network 130 and RAN 140 are from the ISM band; in other words, the total spectrum allocation may include the ISM band or a part thereof.

Each wireless network 120 implements a metric manager 122 and a spectrum enforcer 124. For example, WiFi network 130 implements a WiFi metric manager 132 and a WiFi spectrum enforcer 134. RAN 140 implements a cellular metric manager 142 and a cellular spectrum enforcer 144. Each metric manager 122 and spectrum enforcer 124 may be implemented by any appropriate hardware and/or software that performs the functionality respectively attributed herein to metric manager 122 and spectrum enforcer 124, e.g. functionality including metric determination and spectrum enforcement.

Optionally, the hardware and/or software for implementing a particular metric manager 122 and/or spectrum enforcer 124 is distributed over a plurality of elements comprised in a particular wireless network 120. For example, if WiFi network 130 includes a plurality of wireless access points and a wireless LAN controller, hardware and/or software of the wireless access points may be adapted to determine the metrics and convey the metrics to the wireless LAN controller; whereas hardware and/or software of the wireless LAN controller may be adapted to convey the metrics to spectrum controller 110. Hardware and/or software of the wireless LAN controller may be adapted to receive spectrum allocations and instruct the wireless access points how to enforce the spectrum allocations; and hardware and/or software of the wireless access points may enforce the spectrum allocations as instructed. In such an example, hardware and/or software on the wireless LAN controller and on the wireless access points may implement WiFi metric manager 132 and WiFi spectrum enforcer 134. A particular metric manager 122 implemented by a particular wireless network 120 may be adapted to determine one or more metrics (also referred to as measure(s) or measurement(s)) relating to the particular wireless network 120. A particular spectrum enforcer 124 implemented by a particular wireless network 120 may be adapted to enforce spectrum allocation by spectrum controller 110 for the particular wireless network 120.

Any appropriate apparatus(es) may implement metric manager(s) 122, spectrum enforcer(s) 124, and spectrum controller 110. Before discussing in detail the operations of spectrum controller 110, metric managers 122 and spectrum enforcers 124, examples of certain apparatus(es) for implementing any of spectrum controller 110; metric manager(s) 122, or a part thereof; and spectrum enforcer(s) 124, or a part thereof; will now be described. It is noted that any apparatus, or any part of an apparatus, which includes processing circuitry is also referred to herein as a computer.

Figure 2:
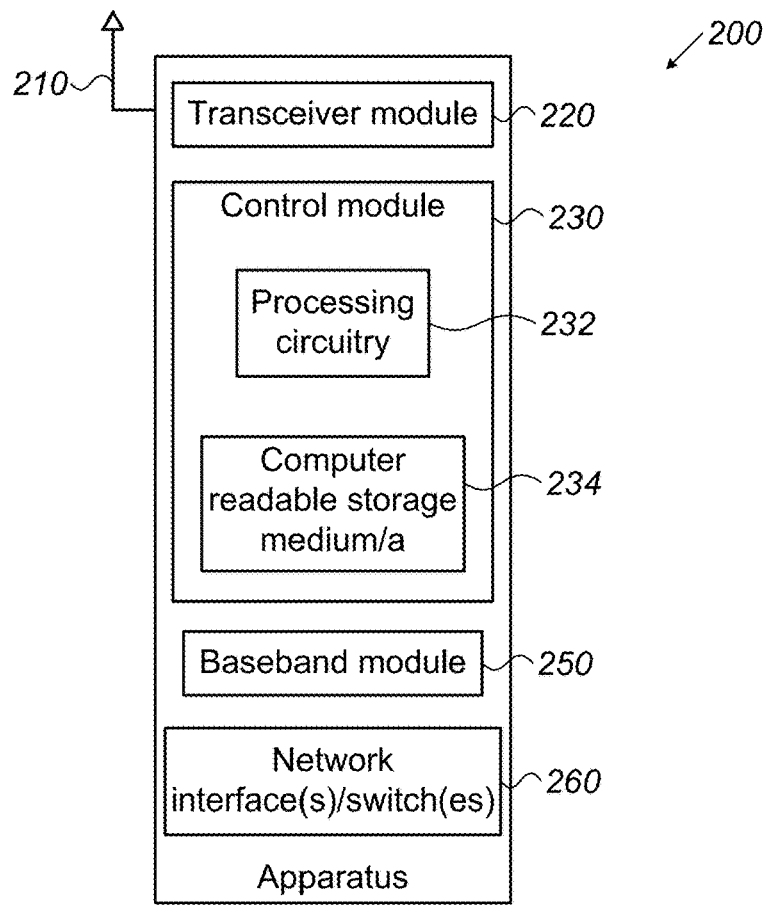
FIG. 2 is a block diagram of an apparatus, in accordance with some embodiments of the presently disclosed subject matter.

FIG. 2 is a block diagram of an apparatus 200, in accordance with some embodiments of the presently disclosed subject matter.

Apparatus 200 may comprise one or more transmitters and receivers of one or more wireless access points of WiFi network 130; and/or may comprise one or more transmitters and receivers of one or more cellular base stations of RAN 140. The transmitter(s) and receiver(s), for instance, may be in a same physical unit, and/or may be attached thereto by cable. For example, a wireless access point of WiFi network 130 and a 5G small cell of RAN 140 may both be included in a same physical unit. Optionally, apparatus 200 implements spectrum controller 110; and/or comprises wireless access point(s) and/or cellular base station(s) that are not associated with wireless networks 120, e.g. in the same physical unit and/or attached thereto by cable.

Apparatus 200 includes networking circuitry, namely at least one antenna 210, a transceiver module 220, and at least one network interface and/or switch 260. Apparatus 200 further includes a control module 230, and a baseband module 250. Transceiver module 220 is adapted to transmit and receive for WiFi network 130 and/or RAN 140, e.g. to and from wireless devices 150 and/or 170. If adapted to transmit and receive for both WiFi network 130 and RAN 140, transceiver module 220 may include separate transmitters/receivers for the two wireless networks 130 and 140, in accordance with the technology transmission/receipt rules of each technology. If adapted to transmit and receive for only one wireless network 130 or 130, transceiver module 220 may include transmitter(s)/receiver(s) for the one wireless network 130 or 140, in accordance with the technology transmission/receipt rules of the corresponding technology.

Transceiver module 220 may perform operations such as any of the following: conversion of signals from baseband to radio frequency signals and vice versa, power amplification of signals prior to transmission, low noise amplification of signals after receipt, distortion compensation, digital to analog conversion, analog to digital conversion, multiplexing, combining, etc. Transceiver module 220 may comprise any hardware and/or software appropriate for performing the functionality that is performed by transceiver module 220. For example, transceiver module 220 may include processing circuitry such as central processing unit(s) (CPU(s)), field programmable gate array(s) (FPGA(s)), and/or other integrated circuit(s), etc.

Baseband module 250 is adapted to perform digital baseband signal processing such as any of the following: modulation, demodulation, power control processing, inter-cell interference control, frequency division multiple access, etc. Baseband module 250 may comprise any hardware and/or software appropriate for performing the functionality performed by baseband module 250. For example, baseband module 250 may include processing circuitry such as FPGA(s) and/or digital signal processor(s) (DSP(s)), etc.

Network interface(s)/switch(es) 260 enable apparatus 200 to communicate via wired connection(s) and/or wirelessly with one or more elements other than wireless devices 150/170. Example(s) of such element(s) may include apparatus(es) for implementing spectrum controller 110, if not implemented by apparatus 200, and/or for implementing policy controller 115; other apparatus(es) which include transmitter(s)/receiver(s) of wireless access point(s) and/or cellular base station(s) that are not included in apparatus 200; a wireless LAN controller (if part of WiFi network 130); a base station controller (if part of RAN 140); element(s) in a core network of the cellular network; and/or element(s) in a public data network (e.g. Internet); etc.

Control module 230 is adapted for other functionality of apparatus 200. For example, control module 230 may at least partly implement WiFi metric manager 132 and/or cellular metric manager 142; and may at least partly implement WiFi spectrum enforcer 134 and/or cellular spectrum enforcer 144. In order to implement such functionality, control module 230 may operate, for instance, in conjunction with baseband module 250 (e.g. in conjunction with signal processing performed by baseband module 250). If spectrum controller 110 is being implemented by apparatus 200, then control module 230 may at least partly implement spectrum controller 110.

Control module 230 may comprise any hardware and/or software appropriate for at least partly implementing metric manager(s) 122, spectrum enforcer(s) 124 and/or spectrum controller 110. For example, control module 230 may comprise at least one computer readable storage medium 234 (also referred to as memory), and may comprise processing circuitry 232. The at least one memory 234 may include, for instance, any of the following: volatile, non-volatile, erasable, non-erasable, removable, non-removable, writeable, re-writeable memory, for short term storing, for long term storing, etc., such as registers, static random access memory (SRAM), dynamic random access memory (DRAM), flash memory, embedded DRAM, etc. Any suitable computer storage medium such as an optical storage medium, a magnetic storage medium, or an electronic storage medium may be used for any of memory/ies 234. Memory/ies 234 (and/or other memory/ies that may be included elsewhere in apparatus 200) may be adapted to store data (e.g. software, metric(s), allocation(s), frequency assignment(s), and/or policy/ies etc.) used by processing circuitry 232 and/or other processing circuitry in apparatus 200.

Processing circuitry 232 may include for example, processor(s) (such as CPU(s), network processor(s), communication processor(s), etc.), FPGA(s), application specific integrated circuit(s) (ASIC(s)), state machine(s), combinatory logic, electronic components, etc. Processing circuitry 232 (and/or other processing circuitry in apparatus 200) may be adapted to perform at least part of the functionality attributed herein to metric manager(s) 122, spectrum enforcer(s) 124, and/or spectrum controller 110. For example, if processing circuitry 232 includes processor(s), and/or other processing circuitry in apparatus 200 (e.g. more specifically in transceiver module 220, baseband module 250, etc.) includes processor(s), such processor(s) may be adapted to perform at least part of such functionality due to being adapted to execute computer readable program code (i.e. software), if any, stored in memory/ies 234 and/or in other memory/ies, if any, in apparatus 200 (e.g. more specifically in any other memory/ies in transceiver module 220, baseband module 250, etc.)

Figure 3:
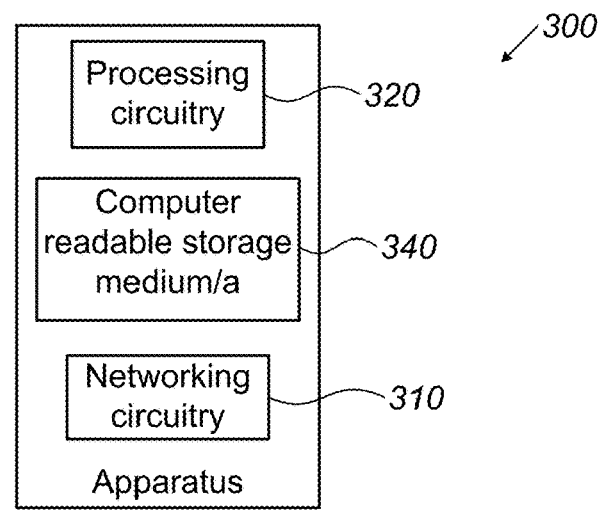
FIG. 3 is a block diagram of another apparatus, in accordance with some embodiments of the presently disclosed subject matter.

FIG. 3 is a block diagram of an apparatus 300 that implements spectrum controller 110, in accordance with some embodiments of the presently disclosed subject matter. Apparatus 300 may implement spectrum controller 110, for example, when spectrum controller 110 is not included in a physical unit with at least one transmitter and receiver for any of wireless networks 120. Apparatus 300 optionally also implements policy controller 115.

In FIG. 3 apparatus 300 includes processing circuitry 320 and one or more computer readable storage media 340. Examples of processing circuitry 320 and computer readable storage medium/a 340 may include examples discussed above with reference to processing circuitry 232 and computer readable storage medium/a 234 of FIG. 2. Memory/ies 340 may be adapted to store data (e.g. software, metric(s), allocation(s), frequency assignment(s), and/or policy/ies etc.) used by processing circuitry 320. Processing circuitry 320 may be adapted to perform functionality attributed herein to spectrum controller 110 (and optionally functionality attributed to policy controller 115). For example, if processing circuitry 320 includes processor(s), such processor(s), may be adapted to perform at least part of such functionality due to being adapted to execute computer readable program code, if any, stored in memory/ies 340.

Apparatus 300 may further include networking circuitry 310. Networking circuitry 310 may include one or more elements for wired and/or wireless communication (e.g. network interface(s), network switch(es), antenna(s), transmitter(s)/receiver(s), etc.) Networking circuitry 310 may be used, for instance, to communicate with one or more elements external to apparatus 300 (e.g. with a wireless LAN controller if included in WiFi network 130; a base station controller if included in RAN 140; other element(s) in WiFi network 130 and/or RAN 140 (optionally in apparatus(es) 200); elements in wireless network(s) other than wireless networks 120; an apparatus implementing policy controller 115 if policy controller is not implemented by apparatus 300; element(s) in a core network; and/or elements(s) in a public data network (e.g. Internet), etc.)

In some embodiments, apparatus 300 may comprise a dedicated computer or plurality of dedicated computer(s) that includes processing circuitry 320, such processing circuitry 320 specially constructed to perform the functionality of spectrum controller 110. Optionally such dedicated computer(s) also perform other functionality (e.g. of policy controller 115). Additionally or alternatively, apparatus 300 may comprise a general purpose computer or plurality of general purpose computer(s) that includes processor(s) in processing circuitry 320, the processor(s) specially configured by software to perform the functionality of spectrum controller 110. Optionally, the general purpose computer(s) also perform other functionality (e.g. of policy controller 115). In embodiments where apparatus 300 include a plurality of computers (such as a cluster of server computers), the plurality of computers may be co-located, or distributed over a plurality of locations.

Figure 4:
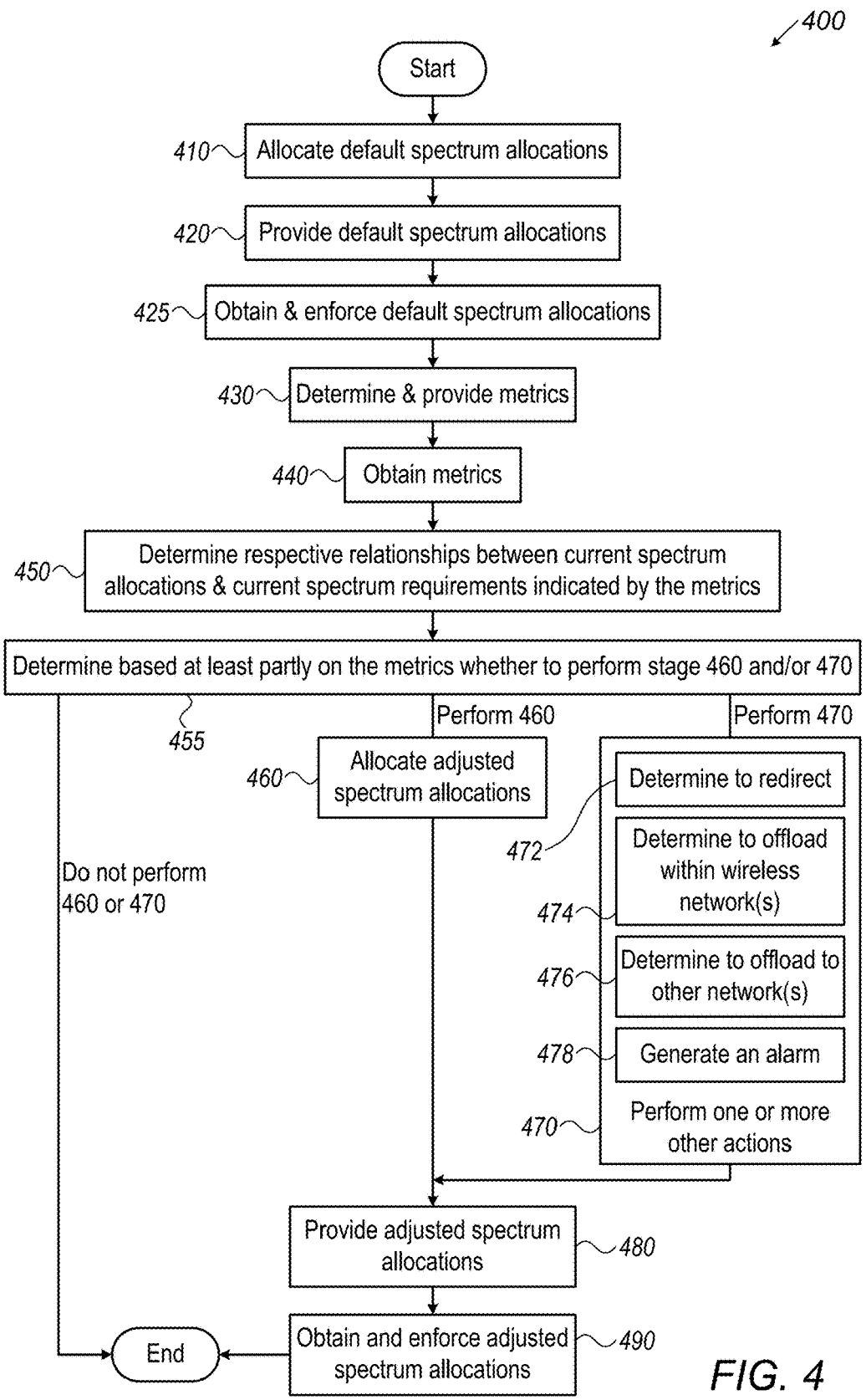
FIG. 4 is a flowchart of a method, in accordance with some embodiments of the presently disclosed subject matter.

FIG. 4 is a flowchart of a method 400, in accordance with some embodiments of the presently disclosed subject matter.

Depending on the embodiment, the total spectrum allocation available for allocation by spectrum controller 110 to WiFi network 130 and RAN 140 may vary. For example, the total spectrum allocation available for allocation may include the ISM band or a part thereof. The total spectrum allocation available for allocation may equal a part of the ISM band, for instance, if certain frequencies of the ISM band are otherwise in use, e.g. by other WiFi network(s), other RAN(s), and/or non-RAN/non-WiFi networks with overlapping coverage range(s) to the coverage range of WiFi network 130 and/or to the coverage range of RAN 140. The other WiFi network(s), other RAN(s), and/or non-RAN/non-WiFi networks may or may not be operated by the same entity/ies as WiFi network 130 and RAN 140.

Method 400, or any part thereof, may be performed one or more times. The spectrum being allocated in any single iteration of method 400, or part thereof, may equal the total spectrum allocation available for allocation to WiFi network 130 and RAN 140, e.g. the ISM band or a part thereof. Additionally or alternatively, the spectra being allocated in various iterations of method 400, or a part thereof, may be various sub-totals of the total spectrum allocation available for allocation to WiFi network 130 and RAN 140; and therefore, each of the various iterations may be performed for less than the total spectrum allocation available for allocation to WiFi network 130 and RAN 140. The various iterations may be performed concurrently and/or sequentially. For example, a particular sub-total of the total spectrum allocation available for allocation to WiFi network 130 and RAN 140 may be any set of contingent frequencies within the ISM band or part thereof that makes up the total spectrum allocation available for allocation to WiFi network 130 and RAN 140. Continuing with describing such an example, there may be 17 or 18 ISM channels, each of which may be a sub-total for which an iteration of method 400 may be performed.

In stage 410, spectrum controller 110 allocates a default spectrum allocation for WiFi network 130, and a default spectrum allocation for RAN 140. For example, the default spectrum allocations may be equal for WiFi network 130 and RAN 140, based on a policy set for WiFi network 130 and RAN 140, e.g. by policy controller 115. As another example, the default spectrum allocations may be unequal based on a policy set for WiFi network 130 and RAN 140, e.g. by policy controller 115. In either of the latter two examples, stage 410 may be performed, for instance, at an initial state, meaning when WiFi network 130 and/or RAN 140 become operative after not being operative, resulting in both wireless networks 130 and 140 being subsequently operative in overlapping coverage ranges. The default spectrum allocations in such examples may be the initial allocations that are made. In such examples, stage 410 may not necessarily be repeated while both WiFi network 130 and RAN 140 are operative.

As another example, default spectrum allocations may be additionally or alternatively allocated based on machine learning techniques which predict metrics from historical metrics, for one or both of WiFi network130 and RAN 140, and for one or more day of the week and/or time of day slots. Continuing with describing such an example for a particular wireless network 120, historical (e.g. multi-dimensional) metric(s) for the particular wireless network 120 may be analyzed by spectrum controller 110. Historical metric(s) for past instances of any particular day of the week and/or time of day slot may be analyzed using Gaussian distribution(s), clustering, log normal, scatter of harmonic/geometric values, and/or any other appropriate analytics technique(s). Historical metric(s) may include, for instance any of channel utilization, bandwidth utilization, number of wireless devices, throughput, mean opinion square (MOS), spectral efficiency, number of flows, number of flows per level of service (e.g. per access category), QCI/bearer, packet loss, jitter, delay, number of retries, user types (e.g. subscriber types) of users affiliated with wireless devices 150 or 170, application types, types of service(s) (e.g. priority, non-priority, best effort, etc.), etc.

If Gaussian distributions are used for certain historical metrics (e.g. channel utilizations) for wireless networks 130 and 140, the peaks and/or sigmas of each of the Gaussian distributions may be used to predict the values of the metrics (e.g. channel utilizations) for wireless networks 130 and 140 for an instance of the particular day of the week and/or time of day slot. Similarly, if Gaussian distributions are used for various historical metrics, the resulting graphs may be combined in n-dimensions; the peaks and/or sigmas of each of the resulting graphs for wireless networks 130 and 140 may be used to predict the values of the multi-dimensional metrics for wireless networks 130 and 140 for an instance of the particular day of the week and/or time of day slot. Such predicted values are an example of a result of the analysis of historical metrics, but the analysis (which may or may not include Gaussian distribution(s)) may produce a result which is not necessarily limited to such predicted values. Default spectrum allocations for WiFi network 130 and RAN 140 for an instance of the particular day of the week and/or time of day slot may be based on an analysis result (e.g. on such predicted values). Such default spectrum allocations may therefore be allocated prior to one or more instances of the day of the week and/or time of day slot(s).

The concept of pressure vectors may be used to further illustrate some embodiments of the subject matter. The default sizes of pressure vectors for WiFi network 130 and RAN 140 may affect the default spectrum allocations for WiFi network 130 and RAN 140 respectively.

Figure 5:
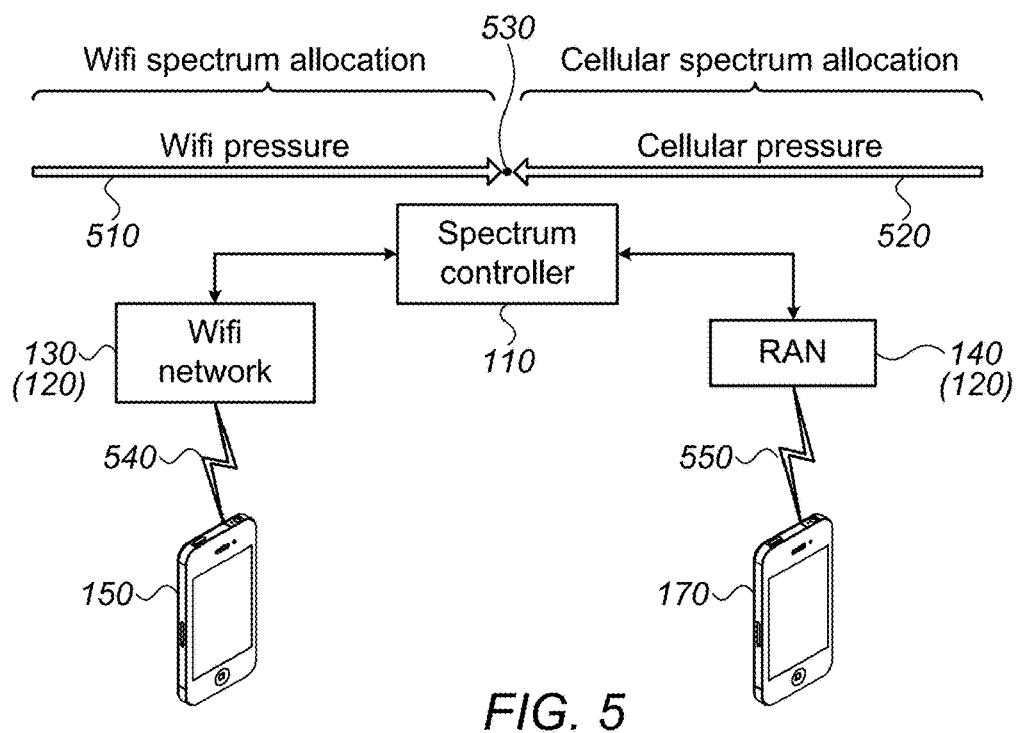
FIG. 5 is a pictorial illustration of default pressure vectors, in accordance with some embodiments of the presently disclosed subject matter.

Reference is now further made to FIG. 5 which is a pictorial illustration of default pressure vectors 510 and 520, in accordance with some embodiments of the presently disclosed subject matter. Default WiFi pressure vector 510 represents the pressure exerted by WiFi network 130. Default cellular pressure vector 520 represents the pressure exerted by RAN 140. Default pressure vectors 510 and 520 are shown as reaching equilibrium at equilibrium point 530. The sizes of default WiFi pressure vector 310 and default cellular pressure vector 520 are shown as equal in FIG. 5 (meaning equal pressure). The similar number of zigzags 540 and 550 and similar number of wireless devices 150 and 170 in FIG. 5 may be representative of similar spectrum requirements for wireless networks 130 and 140.

Due to the equal pressure, equal default spectrum allocations are shown in FIG. 5 as being allocated to WiFi network 130 and RAN 140. It is noted that equal default spectrum allocations does not necessarily imply that adjacent frequencies are necessarily allocated to the same wireless network 120, but just that the amount of spectrum (e.g. the amount of Megahertz) that is allocated is equivalent for both WiFi network 130 and RAN 140. It is further noted that in some embodiments, e.g. due to policy or prediction, the sizes of default pressure vectors 510 and 520 and thus the default spectrum allocations may be unequal.

Returning to the description of method 400, in stage 420, spectrum controller 110 provides the default spectrum allocations to spectrum enforcer 134 and 144. Spectrum enforcers 134 and 144 thereby in stage 425 obtain the default spectrum allocations and enforce the default spectrum allocations. Enforcement by WiFi spectrum enforcer 134 may be performed, for instance, via air time fairness parameters. Enforcement by cellular spectrum enforcer 144 may be performed, for instance, using carrier sense adaptive transmission (CSAT) variables, uplink/downlink maps, etc. Additionally or alternatively, enforcement may include cellular spectrum enforcer 144 disabling certain channels, meaning disabling certain frequency sub-bands. Stages 420 and 425 may be performed after each iteration of stage 410.

Referring for example back to FIGS. 2 and 3 with reference to stage 420, an apparatus (e.g. 200) which implements spectrum controller 110 and one or more particular spectrum enforcers 124 may cause enforcement of the default spectrum allocation(s) relating to the particular spectrum enforcer(s) by enforcing the default spectrum allocation(s) in stage 420. An apparatus (e.g. 200 or 300) which implements spectrum controller 110 but does not implement one or more specific spectrum enforcers 124 may cause enforcement of one or more default spectrum allocations by sending indication(s) of the default spectrum allocation(s) in stage 420 to one or more other apparatuses implementing the specific spectrum enforcer(s) 124 (e.g. via REST APIs and/or the X2 interface). An indication of a default spectrum allocation may specify, for example, the amount of the default spectrum allocation; the amount of increase or decrease compared to the spectrum allocation in place before the allocation in stage 410, provided the allocation in stage 410 is not an initial allocation; the frequency/ies included in the default spectrum allocation, any frequency/ies added and any frequency/ies removed compared to the spectrum allocation in place before the allocation in stage 410 provided the allocation in stage 410 is not an initial allocation; etc.

In stage 430, metrics regarding WiFi network 130 and RAN 140 are determined by WiFi metric manager 132 and cellular metric manager 142, respectively. For example, stage 430 may be performed after stage 420. Additionally or alternatively, stage 430 may be performed periodically although not necessarily in parallel by WiFi metric manager 132 and cellular metric manager 142. The metric(s) which may be determined by WiFi metric manager 132 and/or by cellular metric manager 142 may include any suitable metric(s) regarding WiFi network 130 and/or RAN 140, such as channel utilization, bandwidth utilization, number of wireless devices, throughput, mean opinion square (MOS), spectral efficiency, number of flows, number of flows per level of service (e.g. per access category), QCI/bearer, packet loss, jitter, delay, number of retries, user types (e.g. subscriber types) of users affiliated with wireless devices 150 or 170, application types, types of service(s), etc. Types may include, for instance, priority (e.g. guaranteed quality of service), non-priority, best effort, etc., in descending order of priority. Metrics may be determined, for instance, through radio resource management (RRM), clean air, LTE error vector magnitude (EVM), etc. Metrics may be provided to spectrum controller 110, e.g. in real time, by WiFi metric manager 132 and cellular metric manager 142.

In stage 440, spectrum controller 110 obtains the metrics provided by WiFi metric manager 132 and cellular metric manager 142 in stage 430. Stage 440 may be performed, for instance, after stage 430.

Optionally, spectrum controller 110 obtains in stage 440 one or more other metrics that were not provided by WiFi metric manager 132 and cellular metric manager 142 in stage 430, but which other metric(s) may be useful for spectrum allocation by spectrum controller 110. Spectrum controller 110 may obtain such metrics by determining such metrics. Spectrum controller 110 may, for instance, calculate degradation metric(s) for wireless network(s) 120, e.g. based on delay, packet loss, and jitter metrics provided by metric manager(s) 122. Spectrum controller 110 may additionally or alternatively, for instance, calculate reliability index(es) for wireless network(s) 120 based on jitter, delay and number of retries metrics provided by metric manager(s) 122.

Referring for example to FIGS. 2 and 3, an apparatus (e.g. 200) which implements spectrum controller 110 and one or more particular metric managers 122 may obtain metrics whose determination is attributed to the particular metric manager(s) 122 and/or to spectrum controller 110 by determining such metrics. An apparatus (e.g. 200 or 300) which implements spectrum controller 110, but does not implement one or more specific metric managers 122, may obtain metrics by receiving metrics whose determination is attributed to the specific metric manager(s) 122 from specific one or more other apparatuses which implement the specific metric manager(s) 122 (e.g., via REST APIs and/or the X2 interface), and optionally by determining metrics whose determination is attributed to spectrum controller 110.

In stage 450, spectrum controller 110 determines, for each of wireless networks 130 and 140, the relationship, indicated by the metrics, between the current spectrum allocation and current spectrum requirement for a given wireless network 120. The current spectrum allocation for a given WiFi network 120 may be, for instance, a default spectrum allocation allocated in stage 410 or may be, for instance, an adjusted spectrum allocation allocated in a previous iteration of stage 460 (see description below), whichever is relevant at the time of performance of stage 450.

For example, spectrum controller 110 may determine that the metrics are indicative of a current spectrum allocation for a particular wireless network 120 being less than the current spectrum requirement for the particular wireless network 120 under one or more of the following conditions:

channel utilization above 50%;
above zero degradation metric, meaning there is degradation;
MOS below 4 (or below any other appropriate number);
Spectral efficiency greater than 90% (or any other appropriate percentage) of a maximum spectral efficiency (also referred to as the Shannon limit);
percentage of current spectrum allocation for particular wireless network 120 out of the spectrum being allocated in the current iteration of method 400 is less than the percentage of the number of wireless devices 150 or 170 communicating via particular wireless network 120, out of the total number of wireless devices 150 and 170 communicating via wireless networks 130 and 140, or is less than a threshold dependent on the number of wireless devices 150 or 170 communicating via particular wireless network 120 (e.g. threshold may equal number of wireless devices 150 or 170 communicating via particular wireless network 120 multiplied by a configurable value per wireless device);
percentage of current spectrum allocation for particular wireless network 120 out of the spectrum being allocated in the current iteration of method 400 is less than the percentage of number of flows for particular wireless network 120, out of the total number of flows for wireless networks 130 and 140, or is less than a threshold dependent on the number of flows for particular wireless network 120 (e.g. threshold may equal number of flows for particular wireless network 120 multiplied by a configurable value per flow);
percentage of current spectrum allocation for particular wireless network 120 out of the spectrum being allocated in the current iteration of method 400 is less than the percentage of the number of flows for a particular quality of service level for particular wireless network 120, out of the total number of flows for the particular quality of service for wireless networks 130 and 140, or is less than a threshold dependent on the number of flows for the particular quality of service level for wireless network 120; and/or
any other appropriate condition.

Additionally or alternatively, any of such conditions may be indicative of a negative trend which if not reversed may lead to in the future to a spectrum requirement for particular wireless network 120 being more than a spectrum allocation for particular wireless network 120.

Similarly, spectrum controller 110 may determine, for example, that the metrics are indicative of current spectrum allocation for a particular wireless network 120 being greater than or equal to the current spectrum requirement for the particular wireless network 120 under one or more of the following conditions:

channel utilization equal to or below 50%;
degradation metric is zero or below, meaning no degradation;
MOS equal to or above 4 (or any other appropriate number);
Spectral efficiency equal to or less than 90% (or any other appropriate percentage) of a maximum spectral efficiency;
percentage of current spectrum allocation for particular wireless network 120 out of the spectrum being allocated in the current iteration of method 400 is equal to or greater than the percentage of the number of wireless devices 150 or 170 communicating via particular wireless network 120, out of the total number of wireless devices 150 and 170 communicating via wireless networks 130 and 140, and is equal to or greater than a threshold dependent on the number of wireless devices 150 or 170 communicating via particular wireless network 120 (e.g. threshold may equal number of wireless devices 150 or 170 communicating via particular wireless network 120 multiplied by a configurable value per wireless device);
percentage of current spectrum allocation for particular wireless network 120 out of the spectrum being allocated in the current iteration of method 400 is equal to or greater than the percentage of number of flows for particular wireless network 120, out of the total number of flows for wireless networks 130 and 140, and is equal to greater than a threshold dependent on the number of flows for particular wireless network 120 (e.g. threshold may equal number of flows for particular wireless network 120 multiplied by a configurable value per flow);
percentage of current spectrum allocation for particular wireless network 120 out of the spectrum being allocated in the current iteration of method 400 is equal to or greater than the percentage of the number of flows for a particular quality of service level for particular wireless network 120, out of the total number of flows for the particular quality of service for wireless networks 130 and 140, and is equal to or greater than a threshold dependent on the number of flows for the particular quality of service level for particular wireless network 120; and/or any other appropriate condition.

Additionally or alternatively, any of such conditions may be indicative of a positive trend which if not reversed may lead to in the future to a spectrum requirement for particular wireless network 120 being less than or equal to a spectrum allocation for particular wireless network 120.

In some embodiments, stage 450 may not necessarily be performed. For example, relationships, indicated by the metrics, between the current spectrum allocations and current spectrum requirements for wireless networks 130 and 140, may be determined implicitly as part of stage 455 and/or 460.

In stage 455, spectrum controller 110, determines, based at least partly on the metrics, whether or not to perform stage 460 and allocate adjusted spectrum allocations to wireless network 130 and 140, which are adjusted from the current spectrum allocations. For example, the determination to allocate an adjusted (increased) spectrum allocation to one of wireless networks 130 and 140, and allocate an adjusted (decreased) spectrum allocation to the other of wireless networks 130 and 140 may be at least partly based on relationships indicated by the metrics between current spectrum allocations and current spectrum requirements for wireless networks 130 and 140, e.g. as determined in stage 450. However, other factors may also be considered in determining whether or not to perform stage 460 such as: priority and/or best effort users, applications, services and/or wireless devices 150/170; other actions which may be performed in addition or instead of adjustment of spectrum allocations; etc., as will be described in more detail below.

Optionally in stage 455, spectrum controller 110 also determines based at least partly on the metrics whether or not to perform such other actions (see description below with reference to stage 470 of example other actions).

In a given iteration of method 455, the metrics may be indicative of a first case, namely that the current spectrum allocation for a first of wireless networks 130 and 140 is equal to or greater than the current spectrum requirement for the first wireless network 130 or 140; and the current spectrum allocation for a second of wireless networks 130 and 140 is less than the current spectrum requirement for the second wireless network 130 or 140. The metrics may be indicative of the first case, for example, upon one or more of the following conditions:

channel utilization for the first wireless network 130 or 140 is equal to or below, say, 50%; and the channel utilization for the second wireless network 130 or 140 is above, say, 50%;

degradation metric zero or below and/or MOS equal to or above, say, 4 for the first wireless network 130 or 140; and above zero degradation metric, and/or MOS below, say, 4 for the second wireless network 130 or 140;

spectral efficiency for the first wireless network 130 or 140 is less than or equal to, say, 90% of a maximum spectral efficiency; and spectral efficiency for the second wireless network 130 or 140 is greater than, say, 90% of a maximum spectral efficiency;

percentage of current spectrum allocation for the first wireless network 130 or 140, out of spectrum being allocated in the current iteration of method 400, is greater than or equal to the percentage of wireless devices 150 or 170 communicating via the first wireless network 130 or 140 out of the total wireless devices 150 and 170 communicating via wireless networks 130 and 140, and is greater than or equal to a threshold dependent on the number of wireless devices 150 or 170 communicating via the first wireless network 130 or 140; and the percentage of current allocation for the second wireless network 130 or 140, out of spectrum being allocated in the current iteration of method 400, is less than the percentage of wireless devices 150 or 170 communicating via the second wireless network 130 or 140 out of the total wireless devices 150 and 170 communicating via wireless networks 130 and 140, or is less than a threshold dependent on the number of wireless devices 150 or 170 communicating via the second wireless network 130 or 140;

percentage of current spectrum allocation for the first wireless network 130 or 140, out of spectrum being allocated in the current iteration of method 400, is greater than or equal to a percentage of number of flows for the first wireless network 130 or 140, out of the total number of flows for wireless networks 130 and 140, and is greater than or equal to a threshold dependent on the number of flows for the first wireless network 130 or 140; and the percentage of current spectrum allocation for the second wireless network 130 or 140, out of spectrum being allocated in the current iteration of method 400, is less than a percentage of number of flows for the second wireless network 130 or 140, out of the total number of flows for wireless networks 130 and 140, or is less than a threshold dependent on the number of flows for the second wireless network 130 or 140;

percentage of current spectrum allocation for the first wireless network 130 or 140, out of spectrum being allocated in the current iteration of method 400, is greater than or equal to a percentage of number of flows for a particular quality of service level for the first wireless network 130 or 140, out of the total number of flows for a particular quality of service level for wireless networks 130 and 140, and is greater than or equal to a threshold dependent on the number of flows for the particular quality of service level for the first wireless network 130 or 140; and the percentage of current spectrum allocation for the second wireless network 130 or 140, out of spectrum being allocated in the current iteration of method 400, is less than a percentage of number of flows for the particular quality of service level for the second wireless network 130 or 140, out of the total number of flows for the particular quality of service level for wireless networks 130 and 140, or is less than a threshold dependent on the number of flows for the particular quality of service level for the second wireless network 130 or 140; and/or any other appropriate condition.

Alternatively, in the given iteration of stage 455 the metrics may be indicative of a second case, namely that the current spectrum allocation for a first wireless network 130 or 140 is less than the current spectrum requirement for the first wireless network 130 or 140; and the current spectrum allocation for a second wireless network 130 or 140 is less than the current spectrum requirement for the second wireless network 130 or 140, but that the difference between the current spectrum requirement and the current spectrum allocation for the first wireless network 130 or 140 is smaller than for the second wireless network 130 or 140. The metrics may be indicative of the second case, for example, upon one or more of the following conditions:

- channel utilization for both wireless networks 130 and 140 is above, say, 50%; but the channel utilization for the first wireless network 130 or 140 is lower than the channel utilization for the second wireless network 130 or 140;
- above zero degradation metric and/or MOS below, say, 4 for both wireless networks 130 and 140; but the degradation metric is lower and the MOS is higher for the first wireless network 130 or 140 compared to the second wireless network 130 or 140.
- spectral efficiency for both wireless networks 130 and 140 is greater than, say, 90% of a maximum spectral efficiency; but the percentage of maximum spectral efficiency for the first wireless network 130 or 140 is lower than the percentage of maximum spectral efficiency for the second wireless network 130 or 140;
- percentage of current spectrum allocation is less than the percentage of number of wireless devices 150/170, percentage of number of flows and/or percentage of number of flows for a particular quality of service level, or is less than a threshold, for both wireless networks 130 and 140; but the percentage of current spectrum allocation is higher for the first wireless network 130 or 140 than for the second wireless network 130 or 140; and/or
- any other appropriate condition;

Alternatively in the given iteration, the metrics may be indicative of a third case, namely that the current spectrum allocation for a first wireless network 130 or 140 is equal to or greater than the current spectrum requirement for the first wireless networks 130 or 140; the current spectrum allocation for the second wireless networks 130 and 140 is equal to or greater than the current spectrum requirement for the second wireless network 130 or 140; but the difference between the current spectrum allocation and the current spectrum requirement is larger for the first wireless network 130 or 140 than for the second wireless network 130 or 140. The metrics may be indicative of the third case, for example, upon one or more of the following conditions:

- channel utilization for wireless networks 130 and 140 is equal to or below, say, 50%; but the channel utilization for the first wireless network 130 or 140 is lower than the channel utilization for the second wireless network 130 or 140;
- degradation metric zero or below, and/or MOS equal to or above, say, 4 for both wireless networks 130 and 140; but the degradation metric is lower and the MOS is higher for the first wireless network 130 or 140 compared to the second wireless network 130 or 140.
- Spectral efficiency for both wireless networks 130 and 140 is equal to or less than, say, 90% of a maximum spectral efficiency; but the percentage of maximum spectral efficiency for the first wireless network 130 or 140 is lower than the percentage of maximum spectral efficiency for the second wireless network 130 or 140;
- percentage of current spectrum allocation is equal to or greater than the percentage of number of wireless devices 150/170, percentage of number of flows and/or percentage of number of flows for a particular quality of service level, and is equal to or greater than a threshold, for both wireless networks 130 and 140; but the percentage of current spectrum allocation is higher for the first wireless network 130 or 140 than for the second wireless network 130 or 140; and/or
- any other appropriate condition.

Alternatively, in the given iteration the metrics may be indicative of a fourth case, namely that any difference between the current spectrum requirement and the current spectrum allocation are equivalent for networks 130 and 140. The metrics may be indicative of the fourth case, for example, upon one or more of the following conditions:

- channel utilization for both wireless networks 130 and 140 are equal;
- degradation metric, and/or MOS are equal for both wireless networks 130 and 140;
- spectral efficiency for both wireless networks 130 and 140 are an equal percentage of a maximum spectral efficiency;
- percentage of current spectrum allocation has a similar relationship to percentage of number of wireless devices 150/170, percentage of number of flows and/or percentage of number of flows for a particular quality of service level, for both wireless networks 130 and 140; and/or
- any other appropriate condition.

Depending on the embodiment, it may be determined in stage 455 to perform stage 460 and/or 470 for one or more cases of the above four cases; and/or it may be determined to not perform stage 460 and/or 470 for one or more other cases of the above four cases.

For example, stage 460 may not necessarily be performed if the metrics are indicative of the third case and/or may not be performed if the metrics are indicative of the fourth case described above. As another example, stage 460 may not necessarily be performed due to priority and/or best effort users, applications, services and/or wireless devices 150/170; due to performance of other actions in stage 470 instead of performing stage 460; etc. As another example, stage 470 may be performed if the metrics are indicative of the second case and/or of the first case.

If in stage 455 it was determined, at least partly based on the metrics to allocate adjusted spectrum allocations, then stage 460 is performed. In stage 460, spectrum controller 110 allocates, based at least partly on the metrics, adjusted spectrum allocations for wireless networks 130 and 140 (or in other words adjusts spectrum allocations for wireless networks 130 and 140 from the current spectrum allocations). For example, spectrum controller 110 may allocate a smaller adjusted spectrum allocation for a first wireless network 130 or 140 than the current spectrum allocation for the first wireless network 130 or 140. Spectrum controller 110 may allocate a larger adjusted spectrum allocation for the second wireless network 130 or 140 than the current spectrum allocation for the second wireless network 130 or 140. Adjusted spectrum allocations may be allocated at least partly based on the metrics, because the metrics may be indicative of which of wireless networks 130 and 140 is to have a reduced adjusted spectrum allocation (referred to as the first network) and which is to have an increased adjusted spectrum allocation (referred to as the second network). See above discussion of the four cases where the metrics may be indicative of such a first wireless network and such a second wireless network.

The amount of spectrum adjustment (e.g. increase or decrease) in stage 460 between the current spectrum allocation and the adjusted spectrum allocation may include any appropriate amount. In some embodiments, the amount of adjustment in spectrum allocation in a single iteration of stage 460 may be chosen so as attempt to resolve only a part of the discrepancy between the current spectrum requirement and the current spectrum allocation, or may be chosen so as to attempt to completely resolve the discrepancy. For example, a spectrum allocation may be adjusted by a set amount during any iteration of stage 460, e.g. by 1% of the spectrum being allocated in the current iteration of method 400, even if such an amount may only resolve a part of the discrepancy. As another example, the amount of spectrum adjustment may be affected by the aggregated current spectrum requirements and/or aggregated current spectrum allocations for wireless networks 130 and 140, and therefore may only resolve a part of the discrepancy. Continuing with describing such an example, if the aggregated current spectrum requirements (or in other words the sum of the current spectrum requirements) for wireless networks 130 and 140 is greater than the aggregated current spectrum allocations for wireless networks 130 and 140, then assuming that the aggregated current spectrum requirements is equal to the amount of spectrum that is being allocated in the current iteration, it may not be possible to allocate adjusted spectrum allocations which are equal to or greater than the respective current spectrum requirements for both wireless networks 130 and 140. Therefore the amount of spectrum adjustment may be chosen so as to attempt to resolve only a part of the discrepancy. For instance, if both wireless networks 130 and 140 have channel utilizations above 50%, and spectrum allocations are being adjusted, the adjustment as a percentage of the spectrum being allocated in the current iteration of method 400 may equal the difference in percentage between the higher channel utilization and the lower channel utilization, thereby increasing the spectrum allocation for the wireless network 130 or 140 with the higher channel utilization and reducing the spectrum allocation for the wireless network 130 or 140 with the lower channel utilization.

As an example of attempting to resolve the entire discrepancy, a spectrum allocation may be adjusted by a variable amount during any iteration of stage 460, where the amount of adjustment is dependent on the extent of the discrepancy, as indicated by the metrics, between the current spectrum allocation and the current spectrum requirement. For instance, the amount of spectrum allocation adjustment may be dependent on the amount that channel utilization is above 50%, for a particular wireless network 120. Continuing with describing such an instance, the adjustment as a percentage of the spectrum being allocated in the current iteration of method 400 may equal the difference in percentage between the channel utilization and 50% for the particular wireless network 120, e.g. if only the particular wireless network 120 has channel utilization above 50%, and the other wireless network 120 has a sufficiently low channel utilization.

Additionally or alternatively, a spectrum adjustment may be geared to reaching a certain adjusted spectrum allocation for each of wireless networks 130 and 140. For example, if the number of wireless devices 150 and 170 are respectively 80% and 20% of the total wireless devices 150 and 170 aggregated over wireless networks 130 and 140, then an amount of spectrum adjustment may be selected so as to result in adjusted spectrum allocations which are 80% and 20% respectively of the spectrum being allocated in the current iteration of method 400.

A spectrum allocation decrease in stage 460 for a first wireless network 130 or 140 is typically although not necessarily similar to the spectrum allocation increase for a second wireless network 130 or 140. It is possible, however, that the spectrum allocation decrease for the first wireless network 130 or 140 may be more or less than the spectrum allocation increase for the second wireless network 130 or 140; for instance in order to reserve a certain amount of spectrum in case the spectrum requirement(s) for WiFi network 130 and/or RAN 140 suddenly spike(s). Spectrum controller 110 may then allocate from the reserve.

In some embodiments, a maximum spectrum allocation (e.g. 95% or some other percentage of the spectrum being allocated in the current iteration of method 400) may be configured for any spectrum allocation by spectrum controller 110 to any wireless network 120. In such embodiments, a spectrum allocation above the maximum may not be allocated to a single wireless network 120 (e.g. in stage 460), assuming both WiFi network 130 and RAN 140 are operative. In other words, regardless of how high the current spectrum requirement is for a given wireless network 120, spectrum controller 110 may be adapted to bar the allocation to the given wireless network 120 from exceeding the maximum spectrum allocation, in such embodiments.

Optionally, the amount of adjustment of spectrum allocations in stage 460, or even the decision on whether or not to allocate adjusted spectrum allocations in stage 455, may be affected by prioritization of particular users, applications, services and/or wireless devices 150/170. For example, an adjusted spectrum allocation may be increased by more (or decreased by less) for a particular wireless network 120 serving priority users, applications, services (such as emergency services) and/or wireless devices 150/170 than the amount that the allocation would have been increased/decreased had the users, applications, services and/or wireless devices 150/170 not been prioritized. Similarly, an adjusted spectrum allocation may be decreased by more (or increased by less) for the other wireless network 130 or 140 which is not serving the priority users, applications, services and/or wireless devices 150/170 than the amount that the allocation would have been decreased/increased had particular wireless network 130 or 140 not been serving priority users, applications, services and/or wireless devices 150/170.

In the more general case of either or both wireless networks 130 and 140 serving priority users, applications, services and/or wireless devices 150/170, a specific wireless network 130 or 140 serving more priority users, applications, services, and/or wireless devices 150/170 than a different wireless network 130 or 140 may have the allocation increased by more or decreased by less than had the specific wireless network 130 or 140 served an equal number of, or fewer priority users, applications, services, and/or wireless devices 150/170 than the different wireless network 130 or 140. The different wireless network 130 or 140 serving fewer priority users, applications, services, and/or wireless devices 150/170 (e.g. zero or any number below that served by the specific wireless network 130 or 140), may have the allocation decreased by more or increased by less than had the different wireless network 130 or 140 served an equal number of, or more priority users, applications, services and/or wireless devices 150/170 than the specific wireless network 130 or 140. Less decrease or less increase may in some examples be implemented as no decrease or no increase, or in other words a decision not to allocate an adjusted spectrum allocation. Alternatively, prioritization may not be taken into account when determining an amount of adjustment, e.g. if both wireless networks 130 and 140 serve priority users, applications, services and/or wireless devices 150/170. A priority user (e.g. a premium user) may be identified by, e.g. by subscriber type, by subscriber number, by any other unique identifier of the user, etc.

Optionally, the amount of adjustment of spectrum allocations in stage 460, or even the decision on whether or not to allocate adjusted spectrum allocations in stage 455, may be affected by best effort specific users, applications, services and/or wireless devices 150/170 (e.g. non-critical Internet of Things (IoT) sensor(s)). For example, an adjusted spectrum allocation may be increased by less (or decreased by more) for a particular wireless network 120 serving best effort users, applications, services and/or wireless devices 150/170 (e.g. than the amount that the allocation would have been increased/decreased had the users, applications, services and/or wireless devices 150/170 not been best effort. Similarly, the adjusted spectrum allocation may be decreased by less (or increased by more) for the other wireless network 130 or 140 which is not serving the best effort users, applications, services and/or wireless devices 150/170 than the amount that the allocation would have been decreased/increased had particular wireless network 130 or 140 not been serving best effort users, applications, services and/or wireless devices 150/170.

In the more general case of either or both wireless networks 130 and 140 serving best effort users, applications, services and/or wireless devices 150/170, a specific wireless network 130 or 140 serving more best effort users, applications, services, and/or wireless devices 150/170 than a different wireless network 130 or 140 may have the allocation increased by less or decreased by more than had the specific wireless network 130 or 140 served an equal number of, or fewer best effort users, applications, services, and/or wireless devices 150/170 than the different wireless network 130 or 140. The different wireless network 130 or 140 serving fewer best effort users, applications, services, and/or wireless devices 150/170 (e.g. zero or any number below that served by the specific wireless network 130 or 140), may have the allocation decreased by less or increased by more than had the different wireless network 130 or 140 served an equal number of, or more best effort users, applications, services and/or wireless devices 150/170 than the specific wireless network 130 or 140. Less decrease or less increase may in some examples be implemented as no decrease or no increase, or in other words a decision not to allocate an adjusted spectrum allocation. Alternatively, best effort users, applications, services and/or wireless devices 150/170 may not be taken into account when determining an amount of adjustment, e.g. if both wireless networks 130 and 140 serve best effort users, applications, services and/or wireless devices 150/170.

In some embodiments, spectrum controller 110 may assign one or more specific radio frequencies (also referred to herein as frequencies), dedicated bearers, etc. to WiFi network 130 and/or RAN 140 for the use of certain (e.g. priority) user(s), application(s), service(s) and/or wireless device(s) 150/170. The specific frequency/ies may be the cleaner frequency/ies, or in other words the frequency/ies with less likelihood for interference. WiFi network 130 and/or RAN 140 may monetize such assignment, e.g. by charging the certain user(s), application(s), service(s) and/or wireless device(s) 150/170 more because of such an assignment. A specific frequency or a dedicated bearer may be reserved for the use of the certain user(s), application(s), service(s) and/or wireless device(s) 150/170; or may be used by the certain user(s), application(s), service(s) and/or wireless device(s) 150/170 when needed, replacing any other (e.g. non-priority) uses.

In some embodiments, spectrum controller 110 may remove an assignment of one or more particular frequencies from specific (e.g. best effort) user(s), application(s), service(s) and/or wireless device(s) 150/170 (such as non-critical IoT sensor(s)). For example the assignment may be removed if there is contention for spectrum among users, applications, services and/or wireless devices 150/170.

In some embodiments which include assignment and/or removal of assignment of frequencies, frequencies included in a particular adjusted spectrum allocation, allocated in stage 460 for a particular wireless network 120, may differ from the frequencies included in the current spectrum allocation for the particular wireless network 120. Such a difference may be irrespective of any adjustment in the amount of spectrum. For example, one or more frequencies that were excluded in the current spectrum allocation may be added to the adjusted spectrum allocation for a particular wireless network 120, if such inclusion is necessary for frequency assignment to certain users, applications, services, and/or mobile devices 150/170 served by the particular wireless network 120. Additionally or alternatively, one or more frequencies that were in the current spectrum allocation may be removed from the adjusted spectrum allocation for a particular wireless network 120 due to removal of frequency assignment for specific users, applications, services, and/or wireless devices 150/170 served by the particular wireless network 120.

To further illuminate stage 460, reference is made again to the pressure vectors introduced above. When the current spectrum requirement for a particular wireless network 130 or 140 is greater than the current spectrum allocation for the particular wireless network 130 or 140, the pressure vector for the particular wireless network 130 or 140 may increase, as if the pressure were in a valve. The adjusted spectrum allocation for the particular wireless network 130 or 140 may consequently be increased from the current spectrum allocation. When the current spectrum requirement is less than or equal to the current spectrum allocation for the other wireless network 130 or 140, the pressure vector for the other wireless network 130 or 140 may decrease, as a result of the pressure vector having increased for the particular wireless network 130 or 140. Consequently the adjusted spectrum allocation for the other wireless network 130 or 140 may be decreased from the current spectrum allocation.

Pressure vectors may also be used to describe a scenario where the current spectrum requirements for both wireless networks 120 are above respective current spectrum allocations, and/or a scenario where both current spectrum requirements are equal to or below respective current spectrum allocations, provided allocation adjustments would be applied in such scenario(s). If both are above, the pressure vector for a particular wireless network 130 or 140, which has a greater difference between the current spectrum requirement and the current spectrum allocation, may increase. The pressure vector for the other wireless network 130 or 140 may decrease, as a result of the pressure vector having increased for the particular wireless network 130 or 140. The adjusted spectrum allocation for the particular wireless network 130 or 140 may therefore be increased, and the adjusted spectrum allocation for the other wireless network 130 or 140 may therefore be decreased. If both are equal to or below, the pressure vector for a particular wireless network 130 or 140, which has a smaller difference between the current spectrum allocation and the current spectrum requirement, may increase. The pressure vector for the other wireless network 130 or 140 may decrease, as a result of the pressure vector having increased for the particular wireless network 130 or 140. The adjusted spectrum allocation for the particular wireless network 130 or 140 may therefore be increased, and the adjusted spectrum allocation for the other wireless network 130 or 140 may therefore be decreased.

The spectrum requirement for WiFi network 130 may be represented by a WiFi pressure vector, and the spectrum requirement for RAN 140 may be represented by a cellular pressure vector, as discussed above. Equilibrium may be reached between the WiFi and cellular pressure vectors, for instance, when the adjusted spectrum allocations for both wireless networks 130 and 140 are equal to or greater than the spectrum requirements. Additionally or alternatively, equilibrium may be reached, for instance, when the difference (whether zero, negative or positive) between the adjusted spectrum allocation and the spectrum requirement is equivalent for both wireless networks 130 and 140. In some cases, equilibrium may not necessarily be reached in a given iteration of method 400, e.g. if the allocation adjustment is for a set amount and additional iterations of method 400 are required to reach equilibrium; if equilibrium is impeded due to constraints such as maximum spectrum allocation, priority and/or best effort users, applications, services, and/or wireless devices 150/170, etc.

Figure 6:
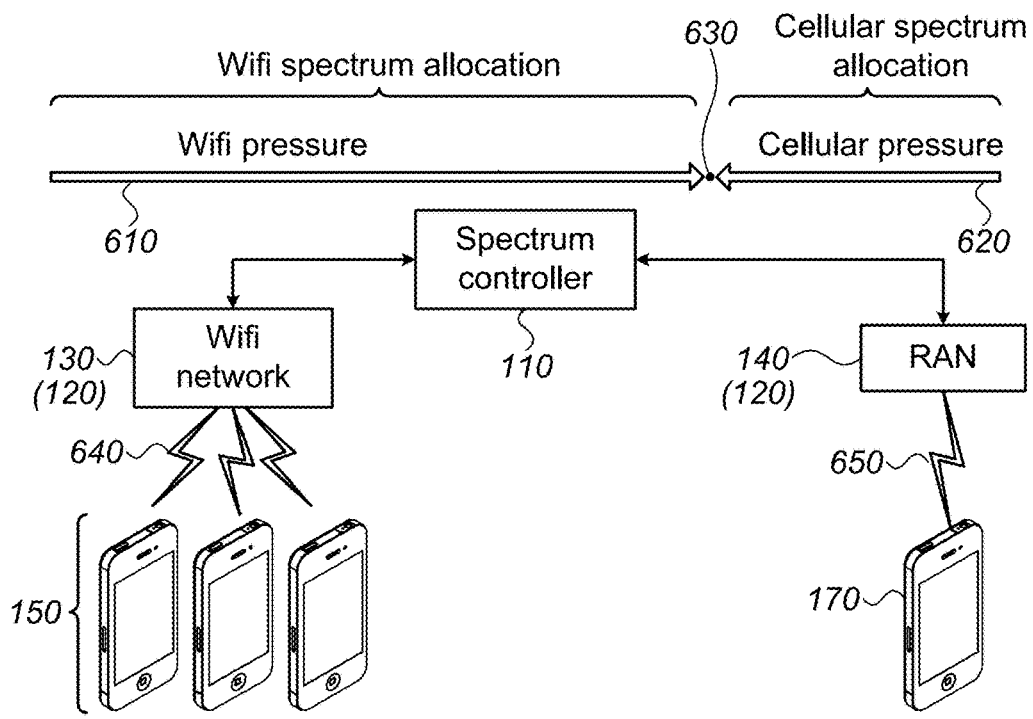
FIG. 6 is a pictorial illustration of pressure vectors, in accordance with some embodiments of the presently disclosed subject matter.

Reference is now made to FIG. 6 which is a pictorial illustration of pressure vectors, in accordance with some embodiments of the presently disclosed subject matter.

In FIG. 6, a WiFi pressure vector 610 has increased from the size of the default WiFi pressure vector 510 of FIG. 5. Such an increase may be due to the current allocation (e.g. default allocation) being insufficient to meet the current spectrum requirement for WiFi network 130. For example, the spectrum requirement may have increased, as FIG. 6 shows higher activity represented by more zigzags 640 and wireless devices 150 for WiFi network 130 compared to the number of zigzags 540 and number of wireless devices for WiFi network 130 in FIG. 5. On the other hand, a cellular pressure vector 620 has decreased from the size of the default cellular pressure vector 520 of FIG. 5. Such a decrease may be due to the current allocation (e.g. default allocation) being equal to or greater than the current spectrum requirement for RAN 140 (e.g. due to no substantial increase in spectrum requirement, as represented by a similar number of zigzags 650 and wireless devices 170 in FIG. 6 as the number of zigzags 550 and wireless devices 170 in FIG. 5); and due to the pressure exerted by the increased WiFi pressure vector 610. Accordingly a larger adjusted spectrum allocation for WiFi network 130 is shown in FIG. 6 than the default spectrum allocation for WiFi network 130 shown in FIG. 5. A smaller adjusted spectrum allocation for RAN 140 is shown in FIG. 6 than the default spectrum allocation for RAN 140 shown in FIG. 5. In FIG. 6 it is assumed that equilibrium is reached. Equilibrium point 630 is shown in FIG. 6 as being characterized by a larger spectrum allocation for WiFi network 130 than for RAN 140.

Figure 7:
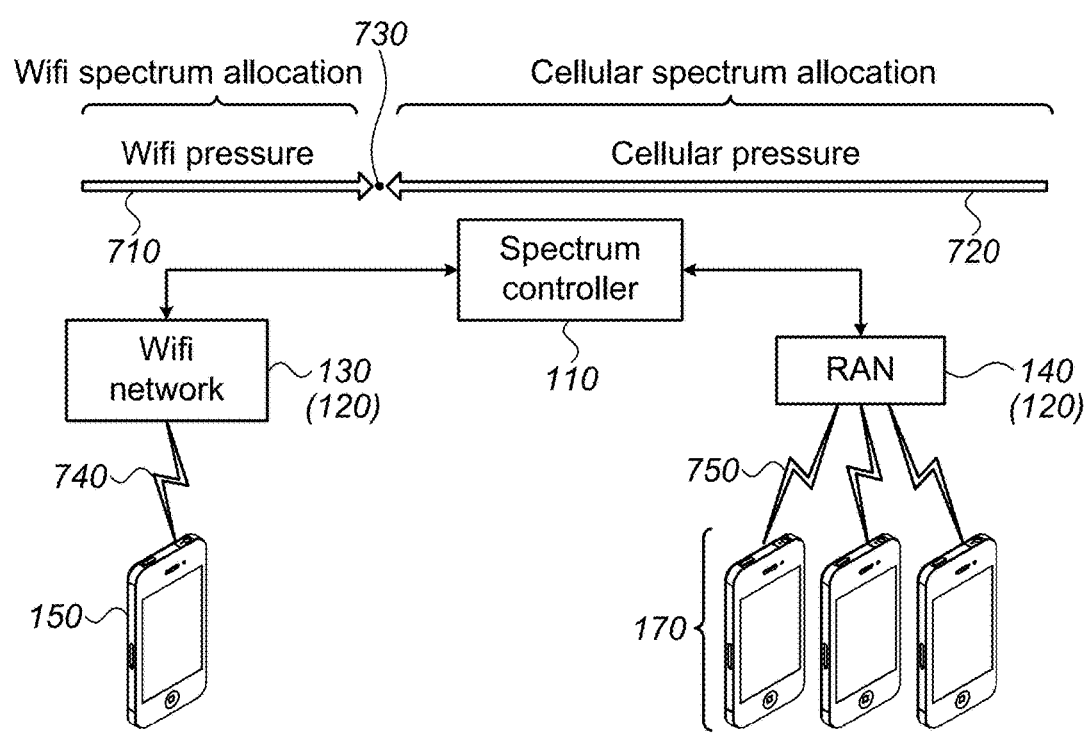
FIG. 7 is another pictorial illustration of pressure vectors, in accordance with some embodiments of the presently disclosed subject matter.

Reference is now made to FIG. 7 which is another pictorial illustration of pressure vectors, in accordance with some embodiments of the presently disclosed subject matter.

In FIG. 7, a cellular pressure vector 720 has increased from the size of the default cellular pressure vector 520 of FIG. 5. Such an increase may be due to the current allocation (e.g. default allocation) being insufficient to meet the current spectrum requirement for RAN 140. For example, the spectrum requirement may have increased, as FIG. 7 shows higher activity represented by more zigzags 750 and wireless devices 170 for RAN 140 compared to the number of zigzags 550 and wireless devices 170 for RAN 140 in FIG. 5. On the other hand, WiFi pressure vector 710 has decreased from the size of the default WiFi pressure vector 510 of FIG. 5. Such a decrease may be due to the current allocation (e.g. default allocation) being greater than or equal to the current spectrum requirement for WiFi network 130 (e.g. due to no substantial increase in spectrum requirement, as represented by a similar number of zigzags 740 and wireless devices 150 in FIG. 7 as the number of zigzags 540 and wireless devices 150 in FIG. 5), and due to the pressure exerted by the increased cellular pressure vector 720. In FIG. 7 it is assumed that equilibrium is reached. Accordingly a larger adjusted spectrum allocation for RAN 140 is shown in FIG. 7 than the default spectrum allocation for RAN 140 shown in FIG. 5. A smaller adjusted spectrum allocation for WiFi network 130 is shown in FIG. 7 than the default spectrum allocation for WiFi network 130 shown in FIG. 5. Equilibrium point 730 is shown in FIG. 7 as being characterized by a larger spectrum allocation to RAN 140 than to WiFi network 130.

It is noted that although FIGS. 6 and 7 may be interpreted to indicate that adjacent frequencies are allocated to each wireless network 120, such an allocation is not necessarily performed. For example, the adjusted spectrum allocation for each wireless network 120 may include some frequencies that are above, and some frequencies that are below, certain frequencies in the adjusted spectrum allocation of the other wireless network 120. However in accordance with FIG. 6, the amount of spectrum in the adjusted spectrum allocation for WiFi network 130 may be expected to be larger than the amount of spectrum in the adjusted spectrum allocation for RAN 140. In accordance with FIG. 7, the amount of spectrum in the adjusted spectrum allocation for RAN 140, may be expected to be larger than the amount of spectrum in the adjusted spectrum allocation for WiFi network 130.

Returning to the description of FIG. 4, if in stage 455 it was determined to perform stage 470, then stage 470 may be performed in addition to or instead of stage 460. Performance of stage 470 may include one or more action(s) illustrated respectively in stages 472, 474, 476, and/or 478

In stage 472, spectrum controller 110 optionally determines to redirect certain (e.g. priority) user(s), application(s), service(s) and/or wireless device(s) 150/170 to the more reliable wireless network 120 of WiFi network 130 and RAN 140. For example, the particular wireless network 130 or 140 which has the higher reliability index may be considered to be the more reliable.

In stage 474, spectrum controller 110 optionally determines, for one or both wireless networks 120, to offload certain (e.g. priority) user(s), application(s), service(s) and/or wireless device(s) 150/170 within a given wireless network 120. For example, certain user user(s), application(s), service(s) and/or wireless device(s) 150 associated with a given wireless access point in WiFi network 130 may be offloaded to a different wireless access point in WiFi network 130.

In stage 476, spectrum controller 110 optionally determines to offload certain (e.g. priority) user(s), application(s), service(s) and/or wireless device(s) 150/170 to at least one other network that is not wireless network 130 or 140 (e.g. to other WiFi networks(s) and/or to other RAN(s)). Offloading from wireless network(s) 130 and/or 140 to other network(s) may reduce the spectrum requirement for WiFi network 130 and/or the spectrum requirement for RAN 140. For example, the offloading may reduce the aggregated spectrum requirements for wireless networks 130 and 140, and therefore may be especially beneficial if the aggregated current spectrum requirements for wireless networks 130 and 140 exceed the amount of spectrum that is being allocated during the current iteration of method 400. The aggregated current spectrum requirements for wireless networks 130 and 140 may exceed the amount of spectrum that is being allocated during the current iteration of method 400, for instance, when the aggregated current spectrum requirements for wireless networks 130 and 140 exceeds the aggregated current spectrum allocations for wireless networks 130 and 140. The aggregated current spectrum requirements for wireless networks 130 and 140 may exceed the aggregated current spectrum allocations for wireless networks 130 and 140, for instance, when the current spectrum requirement for each of wireless networks 130 and 140 exceeds the respective current spectrum allocation for each of wireless networks 130 and 140.

In stage 478, spectrum controller 110 optionally generates an alarm (e.g. simple network management protocol (SNMP) alarm). Such an alarm may be generated, for example, if the aggregated current spectrum requirements for wireless networks 130 and 140 exceed the spectrum that is being allocated during the current iteration of method 400. Such an alarm may be provided, for instance, via a web interface to network management station(s), e.g. associated with administrator(s) of wireless networks 130 and/or 140.

If both stages 460 and 470 are performed, the stages may be performed in any order, or may be performed concurrently.

Stage 480 and 490 will now be described.

If stage 460 is performed then in stage 480, spectrum controller 110 provides the adjusted spectrum allocations to WiFi spectrum enforcer 134 and cellular spectrum enforcer 144. Optionally, spectrum controller 110 provides any assigned frequencies within the adjusted spectrum allocations, and/or any dedicated bearers, for use of certain (e.g. priority) user(s), application(s), service(s) and/or wireless device(s) 150/170. Optionally, spectrum controller 110 additionally or alternatively provides any frequencies, within the adjusted spectrum allocations, that are removed from assignment to specific (e.g. best effort) user(s), application(s), service(s) and/or wireless device(s) 150/170.

Additionally or alternatively, if stage 472 is performed, then in stage 480 spectrum controller 110 instructs WiFi spectrum enforcer 134 and cellular spectrum enforcer 144 regarding a redirection of certain (e.g. priority) user(s), application(s), service(s) and/or wireless device(s) 150/170 to the more reliable wireless network 120. Additionally or alternatively, if stage 474 and/or 476 are performed, spectrum controller 110 instructs WiFi spectrum enforcer 134 and/or cellular spectrum enforcer 144 regarding any offloading determined in stage 474 and/or 476.

If stage 460 and 480 are performed, then in stage 490, the adjusted spectrum allocations and optionally any frequency assignments, dedicated bearers, and/or frequencies removed from assignment are obtained by WiFi spectrum enforcer 134 and cellular spectrum enforcer 144. Accordingly, in stage 490 WiFi spectrum enforcer 134 and cellular spectrum enforcer 144 enforce the adjusted spectrum allocations, and optionally enforce the frequency assignments, dedicated bearers and/or removal of frequency assignments. Enforcement by WiFi spectrum enforcer 134 may be performed, for instance, via air time fairness parameters. Enforcement by cellular spectrum enforcer 144 may be performed, for instance, using CSAT variables, uplink/downlink maps, etc. Additionally or alternatively, enforcement may include disabling certain channels, meaning disabling frequency sub-bands.

In some embodiments, the enforcement of the adjusted spectrum allocations in one or more iterations of stage 490 may achieve a goal of spectrum allocations that are greater than or equal to spectrum requirements for both WiFi network 130 and RAN 140. For example, the channel utilization for each of WiFi network 130 and RAN 140 may be equal to or below 50%, when the spectrum allocations are greater than or equal to spectrum requirements for both wireless networks 130 and 140. Additionally or alternatively, the enforcement of the adjusted spectrum allocations in one or more iterations of method 400 may achieve one or more other goals such as a maximum number of wireless devices 150 and 160 served in the aggregate by wireless network 130 and 140, a maximum number of flows served in the aggregate by wireless networks 130 and 140, and/or a maximum number of flows per quality of service level served in the aggregate by wireless networks 130 and 140.

In some other embodiments, the enforcement of the adjusted spectrum allocations in one or more iterations of method 490 may not necessarily result in any or all of the above goals being achieved. If, for example, the amount of adjustment of spectrum allocations, or even the decision whether or not to adjust spectrum allocations, was affected by prioritization of particular user(s), applications, service(s) and/or wireless device(s) 150/170; then in such an example, the enforcement during one or more iterations of method 490 may have resulted in a larger than required adjusted spectrum allocation for a given wireless network 120 having more priority user(s), application(s), service(s) (e.g. emergency services) and/or wireless device(s) 150/170 compared to the other wireless network 120. As another example, if an adjusted spectrum allocation is barred from exceeding a maximum spectrum allocation, the enforcement during one or more iterations of method 490 may in some cases result in a smaller than required spectrum allocation. As another example, if the aggregated spectrum requirements for wireless networks 130 and 140 exceeds the spectrum that is being allocated during one or more iterations of method 400, smaller than required adjusted spectrum allocations may be enforced during the one or more iterations, unless the aggregated spectrum requirements may be reduced, e.g. by offloading to other network(s).

If any of stages 472 to 476 are performed, and stage 480 is performed, then in stage 490, redirection and/or offloading instructions may be obtained by WiFi spectrum enforcer 134 and cellular spectrum enforcer 144 for certain (e.g. priority) user(s), application(s), service(s) and/or wireless device(s) 150/170. WiFi spectrum enforcer 134 and and/or cellular enforcer 144 may perform the redirection and/or offloading. For example, such user(s), application(s), service(s) and/or wireless device(s) 150/170 may be redirected to the more reliable wireless network 130 or 140 by one of WiFi spectrum enforcer 134 or cellular spectrum enforcer 144 redirecting the user(s), application(s), service(s) and/or wireless device(s) 150/170 to the other spectrum enforcer 134 or 144; provided the other spectrum enforcer 134 or 144 is associated with the more reliable wireless network 130 or 140. Additionally or alternatively, such user(s), application(s), service(s) and/or wireless device(s) 150/170 may be offloaded by spectrum enforcer(s) 134 and/or 144 within the network and/or to other network(s). For example, if offloading occurs from a first wireless access point to a second wireless access point in wireless network 130, a part of WiFi spectrum enforcer 134 implemented by the first wireless access point and a part of WiFi spectrum enforcer 134 implemented by the second wireless access point (and optionally a part of WiFi spectrum enforcer 134 implemented by a wireless LAN controller) may participate in the offloading. As another example, if the offloading is from RAN 140 to another RAN, cellular enforcer 144 and another cellular enforcer implemented by the other RAN may participate in the offloading.

Referring again to FIGS. 2 and 3, an apparatus (e.g. 200) which implements spectrum controller 110 and one or more particular spectrum enforcer(s) 124 may cause enforcement of the adjusted spectrum allocation(s) relating to the particular spectrum enforcer(s) 124 (and optionally cause enforcement of frequency assignment, dedicated bearers, frequency removal, redirection and/or offloading) by enforcing the adjusted spectrum allocation(s) (and optionally enforcing the frequency assignment, dedicated bearers, frequency removal, redirection and/or offloading) in stage 490. An apparatus (e.g. 200 or 300) which implements spectrum controller 110 but does not implement one or more specific spectrum enforcer(s) 124 may cause enforcement of adjusted spectrum allocation(s) relating to the specific spectrum enforcer(s) 124 (and optionally cause enforcement of frequency assignment, dedicated bearers, frequency removal, redirection and/or offloading) by sending indication(s) of the adjusted spectrum allocation(s) (and optionally of any of: frequency assignments, dedicated bearers, removal of frequency assignments, redirection and/or offloading) in stage 480 to the specific wireless network(s) 120 which implement the specific spectrum enforcer(s) 124 (e.g. via REST APIs and/or the X2 interface). An indication of an adjusted spectrum allocation may include for example, the amount of the adjusted spectrum allocation, the increase/decrease in amount compared to the current spectrum allocation, the frequency/ies included in the adjusted spectrum allocation, any frequency/ies added and any frequency/ies removed compared to the current spectrum allocation, etc.

If stage 490 is performed, then method 400 may end after stage 490. If, in stage 455, it was determined not to perform stage 460 or stage 470, then stages 460 to 490 may be omitted, and method 400 may end after stage 455. Alternatively, if, in stage 455, it was determined not to perform stage 460 or stage 470, then before ending method 400 after stage 455, the current spectrum allocations may be provided again by spectrum controller 110 to spectrum enforcers 134 and 144, and consequently obtained and re-enforced by spectrum enforcers 134 and 144.

In some embodiments, method 400 may include fewer, more and/or different stages than described with reference to FIG. 4. Additionally or alternatively, stages may be performed in a different appropriate order than illustrated; two or more stages that are illustrated as being performed sequentially may be performed concurrently, if appropriate; and/or two or more stages that are illustrated as being performed concurrently may be performed sequentially, if appropriate.

Method 400 or any part thereof may be performed one or more times for the total spectrum available for allocation to wireless networks 130 and 140, and/or may be performed one or more times for any sub-total of the total spectrum available for allocation to wireless networks 130 and 140. In some embodiments, various iterations of method 400 or any part thereof may be performed for various sub-totals of the total spectrum available for allocation to wireless networks 130 and 140. It is noted that even if an iteration is performed for a sub-total of the total spectrum available for allocation, the allocation to any wireless network 120 may be considered to be out of the total, since the sub-total is part of the total.

In some embodiments, over the lifetime of spectrum controller 110 allocating adjusted spectrum allocations to WiFi network 130 and RAN 140, there may be a plurality of iterations of method 400 or any part thereof. In some iterations, adjusted spectrum allocations may be allocated (e.g. in stage 460) due at least to a changed spectrum requirement for WiFi network 130, whereas in other iterations, adjusted spectrum allocations may be allocated due at least to a changed spectrum requirement for RAN 140. In part of the iterations, an adjusted spectrum allocation allocated for WiFi network 130, e.g. in stage 460, may be increased from (meaning may be greater than) the current spectrum allocation for WiFi network 130; and an adjusted spectrum allocation allocated for RAN 140, e.g. in stage 460, may be decreased from (meaning may be less than) the current spectrum allocation for RAN 140. In another part of the iterations, an adjusted spectrum allocation allocated for RAN 140, e.g. in stage 460, may be increased from the current spectrum allocation for RAN 140; and an adjusted spectrum allocation allocated for WiFi network 130, e.g. in stage 460, may be decreased from the current spectrum allocation for WiFi network 130.

Some embodiments of the subject matter may include one or more of the following advantages. First, spectrum allocations for WiFi and radio access networks may be optimized. Second, the optimization may be dynamic, or in other words based on current spectrum requirements. Third, the optimization may take into account the spectrum requirements of both WiFi and radio access networks. Fourth, metrics which are already being generated, e.g. for reporting purposes, may be used and therefore new metrics need not be generated if not desirable. Fifth, WiFi and radio access networks may be relieved of the task of detecting which frequency to use, as spectrum allocations are allocated to the WiFi and radio access networks. Sixth, co-channel interference between WiFi and radio access networks in the same space may be reduced or eliminated. Seventh, optimization of spectrum allocations may enhance the user experience of users. Eighth, optimization of spectrum allocations may also enable co-existence of WiFi and radio access networks, in contrast to mechanisms which simply allow co-existence without optimization of spectrum use. Other advantages may be apparent from the description herein.

It will be appreciated that the subject matter contemplates, for example, a computer program product comprising a computer readable storage medium having computer readable program code embodied therein for causing a computer to perform any method in accordance with the subject matter (e.g. method 400), or any part of any method in accordance with the subject matter. Further contemplated, for example, is such computer readable program code. Further contemplated, for example, is such a computer readable storage medium.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. An apparatus comprising:
processing circuitry; and
at least one computer readable storage medium adapted to store data used by the processing circuitry;
wherein the processing circuitry is adapted to perform the following a plurality of times:
obtain metrics regarding a Wireless Local Area Network (WLAN) and a Radio Access Network (RAN) of a cellular network, the WLAN and the RAN having overlapping coverage ranges,
based at least partly on said metrics, allocate a first adjusted spectrum allocation to a first network, of the WLAN and RAN, and a second adjusted spectrum allocation to a second network, of the WLAN and RAN, said first adjusted spectrum allocation decreased from a first current spectrum allocation for the first network, and said second adjusted spectrum allocation increased from a second current spectrum allocation for the second network, and
cause enforcement of the first adjusted spectrum allocation and the second adjusted spectrum allocation,
wherein in at least two of the plurality of times, said metrics are indicative that for the first network, the first current spectrum allocation is greater than or equal to a first current spectrum requirement for the first network, and that for the second network, the second current spectrum allocation is less than a second current spectrum requirement for the second network, and
wherein in at least one of the at least two times the first network is the WLAN and the second network is the RAN, and in at least one other of the at least two times the first network is the RAN and the second network is the WLAN.

2. The apparatus of claim 1, further comprising networking circuitry, wherein said processing circuitry is adapted to cause enforcement by being adapted to send via the networking circuitry at least one of: a first indication of the first adjusted spectrum allocation or a second indication of the second adjusted spectrum allocation.

3. The apparatus of claim 1, wherein said apparatus further includes at least one of: at least one transmitter and receiver of the WLAN or at least one transmitter and receiver of the RAN, and wherein said processing circuitry is adapted to cause enforcement by being adapted to enforce at least one of: the first adjusted spectrum allocation or the second adjusted spectrum allocation.

4. The apparatus of claim 1, wherein the WLAN and the RAN are both operated by a same enterprise.

5. The apparatus of claim 1, wherein in one or more of the plurality of times, said metrics are indicative that the first current spectrum allocation is less than the first current spectrum requirement, that the second current spectrum allocation is less than the second current spectrum requirement, and that the second current spectrum requirement exceeds the second current spectrum allocation by more than the first current spectrum requirement exceeds the first current spectrum allocation.

6. The apparatus of claim 1, wherein in one or more of the plurality of times, said metrics are indicative that the first current spectrum allocation is greater than or equal to the first current spectrum requirement, that the second current spectrum allocation is greater than or equal to the second current spectrum requirement, and that the second current spectrum allocation exceeds the second current spectrum requirement by less than the first current spectrum allocation exceeds the first current spectrum requirement.

7. The apparatus of claim 1, wherein in one or more of the plurality of times the processing circuitry is further adapted to:
analyze historical metrics for past instances of at least one of: a specific day of week or a specific time of day, producing a result;
allocate said first current spectrum allocation and said second current spectrum allocation for an instance of the at least one of: the specific day of week or the specific time of day, based on said result; and
cause enforcement of said first current spectrum allocation and said second current spectrum allocation.

8. The apparatus of claim 1, wherein in one or more of the plurality of times one network of the first network and the second network has more of at least one of: priority users, priority wireless devices, priority applications, or priority services compared to another network of the first network and the second network, and wherein the processing circuitry is adapted in the one or more of the plurality of times to allocate an adjusted spectrum allocation for the one network, that is decreased by less or increased by more from a current spectrum allocation for the one network, than had the one network had an equal number of or fewer priority users, priority wireless devices, priority applications, and priority services than the other network.

9. The apparatus of claim 1, wherein in a first time of said plurality of times, said first current spectrum allocation and said second spectrum allocation are unequal initial spectrum allocations.

10. The apparatus of claim 1, wherein the first adjusted spectrum allocation and the second adjusted spectrum allocation allocated in an earlier time of the plurality of times, are the first current spectrum allocation and second current spectrum allocation in a later time of the plurality of times.

11. The apparatus of claim 1, wherein said metrics include a first channel utilization for the first network and a second channel utilization for the second network, and wherein the second channel utilization obtained in an earlier time of the plurality of times is above 50%, but after allocation of said second adjusted spectrum allocation in the earlier time of the plurality of times, the first channel utilization and the second channel utilization obtained in a later time of the plurality of times are equal to or below 50%.

12. The apparatus of claim 1, wherein the processing circuitry is further adapted to cause at least one of:
offloading to at least one other network at least one of: one or more users, one or more wireless devices, one or more applications, or one or more services, the at least one other network including at least one of: another WLAN or another RAN;
redirecting of at least one of: one or more users, one or more wireless devices, one or more applications, or one or more services to a more reliable network of the WLAN and the RAN; or
enforcement of frequency assignment to, or removal of frequency assignment from, at least one of: one or more users, one or more applications, one or more services, or one or more wireless devices.

13. The apparatus of claim 1, wherein the adjusted spectrum allocations are from an industrial, scientific, and medical radio band.

14. The apparatus of claim 1, wherein each of said adjusted spectrum allocations is below a configured maximum spectrum allocation.

15. A method comprising:
obtaining metrics regarding a Wireless Local Area Network (WLAN) and Radio Access Network (RAN) of a cellular network, the WLAN and the RAN having overlapping coverage ranges,
based at least partly on said metrics, allocating a first adjusted spectrum allocation to a first network, of the WLAN and RAN, and a second adjusted spectrum allocation to a second network, of the WLAN and RAN, said first adjusted spectrum allocation decreased from a first current spectrum allocation for the first network, and said second adjusted spectrum allocation increased from a second current spectrum allocation for the second network; and
causing enforcement of the first adjusted spectrum allocation and the second adjusted spectrum allocation,
wherein said obtaining, allocating and causing are performed a plurality of times, and wherein in at least two of the plurality of times, said metrics are indicative that for the first network, the first current spectrum allocation is greater than or equal to a first current spectrum requirement for the first network, and that for the second network, the second current spectrum allocation is less than a second current spectrum requirement for the second network, and wherein in at least one of the at least two times the first network is the WLAN and the second network is the RAN, and in at least one other of the at least two times the first network is the RAN and the second network is the WLAN.

16. The method of claim 15, further comprising:
analyzing historical metrics for past instances of at least one of: a specific day of week or a specific time of day;
allocating said first current spectrum allocation and said second current spectrum allocation for an instance of the at least one of: the specific day of week or the specific time of day, based on a result of said analyzing; and
causing enforcement of said first current spectrum allocation and said second current spectrum allocation.

17. The method of claim 15, wherein said metrics include a first channel utilization for the first network and a second channel utilization for the second network, and wherein the second channel utilization obtained in an earlier time of the plurality of times is above 50%, but after allocation of said second adjusted spectrum allocation in the earlier time of the plurality of times, the first channel utilization and the second channel utilization obtained in a later time of the plurality of times are equal to or below 50%.

18. The method of claim 15, further comprising:
causing at least one of:
    enforcement of frequency assignment to, or removal of frequency assignment from at least one of: one or more users, one or more applications, one or more services, or one or more wireless devices;
    redirecting of at least one of: one or more users, one or more wireless devices, one or more applications, or one or more services to a more reliable network of the WLAN and the RAN; or
    offloading at least one of: one or more users, one or more wireless devices, one or more applications, or one or more services to at least one other network, the at least one other network including at least one of: another WLAN or another RAN.

19. A computer program product, comprising a non-transitory computer readable medium having computer readable program code embodied therein, the computer program product comprising:
    computer readable program code for causing a computer to obtain metrics regarding a WLAN and a Radio Access Network (RAN) of a cellular network, the WLAN and the RAN having overlapping coverage ranges;
    computer readable program code for causing the computer to allocate, based at least partly on said metrics, a first adjusted spectrum allocation to a first network, of the WLAN and RAN, and a second adjusted spectrum allocation to a second network, of the WLAN and RAN, said first adjusted spectrum allocation decreased from a first current spectrum allocation for the first network, and said second adjusted spectrum allocation increased from a second current spectrum allocation for the second network; and
    computer readable program code for causing the computer to cause enforcement of the first adjusted spectrum allocation and the second adjusted spectrum allocation,
    wherein the computer readable program code for causing the computer to obtain, allocate and cause enforcement, causes the computer to obtain, allocate and cause enforcement a plurality of times, and wherein in at least two of the plurality of times, said metrics are indicative that for the first network, the first current spectrum allocation is greater than or equal to a first current spectrum requirement for the first network, and that for the second network, the second current spectrum allocation is less than a second current spectrum requirement for the second network, and wherein in at least one of the at least two times the first network is the WLAN and the second network is the RAN, and in at least one other of the at least two times the first network is the RAN and the second network is the WLAN.

20. The computer program product of claim 19, further comprising:
    computer readable program code for causing the computer to analyze historical metrics for past instances of at least one of: a specific day of week or a specific time of day;
    computer readable program code for causing the computer to allocate said first current spectrum allocation and said second current spectrum allocation for an instance of the at least one of: the specific day of week or the specific time of day, based on a result of said analyzing; and
    computer readable program code for causing the computer to cause enforcement of said first current spectrum allocation and said second current spectrum allocation.

* * * * *

UNITED STATES PATENT AND TRADEMARK OFFICE
CERTIFICATE OF CORRECTION

PATENT NO. : 10,349,384 B2
APPLICATION NO. : 15/821767
DATED : July 9, 2019
INVENTOR(S) : Robert Barton et al.

Page 1 of 1

It is certified that error appears in the above-identified patent and that said Letters Patent is hereby corrected as shown below:

In the Claims

Claim 15, Column 29, Line 3, please replace "and Radio" with --and a Radio--

Signed and Sealed this
Tenth Day of September, 2019

Andrei Iancu
*Director of the United States Patent and Trademark Office*